(12) United States Patent
Li et al.

(10) Patent No.: US 12,277,005 B2
(45) Date of Patent: Apr. 15, 2025

(54) FOLDING APPARATUS AND ELECTRONIC DEVICE

(71) Applicant: Huawei Technologies Co., Ltd., Shenzhen (CN)

(72) Inventors: Yunyong Li, Shanghai (CN); Chunjun Ma, Shanghai (CN); Zhengyi Xu, Shanghai (CN); Linhui Niu, Shanghai (CN); Ting Liu, Shanghai (CN); Gangchao Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 18/001,827

(22) PCT Filed: Jun. 15, 2021

(86) PCT No.: PCT/CN2021/100140
§ 371 (c)(1),
(2) Date: Dec. 14, 2022

(87) PCT Pub. No.: WO2021/254336
PCT Pub. Date: Dec. 23, 2021

(65) Prior Publication Data
US 2023/0229189 A1 Jul. 20, 2023

(30) Foreign Application Priority Data
Jun. 15, 2020 (CN) .......................... 202010544417.X

(51) Int. Cl.
*H05K 5/00* (2006.01)
*G06F 1/16* (2006.01)
*H04M 1/02* (2006.01)

(52) U.S. Cl.
CPC .......... *G06F 1/1616* (2013.01); *H04M 1/022* (2013.01)

(58) Field of Classification Search
CPC ... H05K 5/0017; H05K 5/0217; G06F 1/1616
USPC .................................. 361/807, 755, 809, 810
See application file for complete search history.

(56) References Cited

U.S. PATENT DOCUMENTS

| | | |
|---|---|---|
| 2015/0330614 A1 | 11/2015 | Lee et al. |
| 2017/0115701 A1 | 4/2017 | Bae et al. |
| 2018/0324964 A1* | 11/2018 | Yoo ........................... H05K 5/03 |
| 2018/0335679 A1 | 11/2018 | Hashimoto et al. |
| 2019/0208649 A1* | 7/2019 | Jeon ...................... G06F 1/1652 |
| 2020/0103935 A1* | 4/2020 | Hsu ........................ G06F 1/1681 |
| 2022/0068165 A1* | 3/2022 | Park ....................... G06F 1/1616 |

FOREIGN PATENT DOCUMENTS

| | | |
|---|---|---|
| CN | 106205385 A | 12/2016 |
| CN | 106255935 A | 12/2016 |
| CN | 107358874 A | 11/2017 |

(Continued)

*Primary Examiner* — Hung S. Bui
(74) *Attorney, Agent, or Firm* — Slater Matsil, LLP

(57) ABSTRACT

A rotation mechanism, includes a middle housing (1), a first support (2) and a second support (3), a first end of the first support is rotatably connected to the middle housing, and a second end of the first support is fixedly connected to a first housing; a first end of the second support is rotatably connected to the middle housing, and a second end of the second support is fixedly connected to a second housing.

19 Claims, 13 Drawing Sheets

(56) References Cited

FOREIGN PATENT DOCUMENTS

| | | | | |
|---|---|---|---|---|
| CN | 109658827 | A | 4/2019 | |
| CN | 209358590 | U | 9/2019 | |
| CN | 110515426 | A | 11/2019 | |
| CN | 110714977 | A * | 1/2020 | ............. H04M 1/02 |
| CN | 110971728 | A | 4/2020 | |
| CN | 210244253 | U | 4/2020 | |
| CN | 210297784 | U | 4/2020 | |
| CN | 210377243 | U | 4/2020 | |
| CN | 111147637 | A | 5/2020 | |
| CN | 210694021 | U | 6/2020 | |
| CN | 210694025 | U * | 6/2020 | ............. G06F 1/16 |
| EP | 3355159 | A1 | 8/2018 | |
| JP | 2020053001 | A | 4/2020 | |
| WO | 2016140524 | A1 | 9/2016 | |

* cited by examiner

FOLDING APPARATUS AND ELECTRONIC DEVICE

CROSS-REFERENCE TO RELATED APPLICATIONS

This application is a National Stage of International Application No. PCT/CN2021/100140, filed on Jun. 15, 2021, which claims priority to Chinese Patent Application No. 202010544417.X, filed on Jun. 15, 2020. Both of the aforementioned applications are hereby incorporated by reference in their entireties.

TECHNICAL FIELD

This application relates to the field of foldable electronic product technologies, and in particular, to a folding apparatus and an electronic device.

BACKGROUND

In recent years, a flexible display is widely applied to various foldable electronic devices because of characteristics such as lightness, thinness, and non-fragileness. The foldable electronic device further includes a folding apparatus configured to carry the flexible display. The folding apparatus generally includes two housings and a rotation mechanism connected between the two housings. The two housings are folded and unfolded relative to each other through deformation of the rotation mechanism, and drive the flexible display to be folded and unfolded. At present, the rotation mechanism of the folding apparatus usually adopts a multi-stage hinge structure as a main moving mechanism. The multi-stage hinge structure has a large quantity of parts, a complex fitting relationship, and a large accumulated transmission error. This easily leads to insufficient control precision of the rotation mechanism.

SUMMARY

An objective of this application is to provide a folding apparatus and an electronic device. A main moving mechanism of a rotation mechanism of the folding apparatus has a small quantity of parts, a simple fitting relationship, a small accumulated transmission error, and high control precision.

According to a first aspect, this application provides a folding apparatus, configured to carry a flexible display. The folding apparatus may be applied to an electronic device. The folding apparatus includes a first housing, a rotation mechanism, and a second housing that are sequentially connected. The rotation mechanism can deform, so that the first housing and the second housing are folded or unfolded relative to each other.

The rotation mechanism includes a middle housing, a first support, and a second support. One end of the first support is rotatably connected to the middle housing, and the other end is fixedly connected to the first housing. The first support includes a support surface used to carry the flexible display, and the support surface of the first support is spliced with a support surface of the first housing to form a first support surface. One end of the second support is rotatably connected to the middle housing, and the other end is fixedly connected to the second housing. The second support includes a support surface used to carry the flexible display, and the support surface of the second support is spliced with a support surface of the second housing to form a second support surface.

When the first housing and the second housing are unfolded relative to each other to an open state, the first support and the second support are close to each other, and the first support surface is flush with the second support surface. When the first housing and the second housing are folded relative to each other to a closed state, the first support and the second support are far away from each other, and the first support surface and the second support surface gradually approach each other in a direction away from the middle housing. In this case, the flexible display is located on an inner side of the folding apparatus.

In this application, the main moving mechanism of the rotation mechanism of the folding apparatus is a single-stage rotatable connection mechanism among the first support, the second support and the middle housing. Because of a small quantity of parts, a simple part fitting relationship, a degree of freedom of 1, a short size chain, and a small accumulated error, the main moving mechanism of the rotation mechanism is high in control precision. This improves rotation precision of the folding apparatus, and helps improve use experience of an electronic device to which the folding apparatus is applied.

In addition, when the first housing and the second housing are unfolded relative to each other to the open state, the first support and the second support are close to each other, and the first support surface is flush with the second support surface, so that the first support surface can provide flat strong support for the flexible display. This improves user experience such as a touch operation and picture viewing.

"The support surface of the first support is spliced with a support surface of the first housing" is a case in which the support surface of the first support is connected to the support surface of the first housing, without a gap between the two. In another possible implementation, "the support surface of the first support is spliced with a support surface of the first housing" is a case in which the support surface of the first support is close to the support surface of the first housing, with a small gap between the two. In the case in which there is a small gap between the support surface of the first support and the support surface of the first housing, if a user presses a region that is of the flexible display and that corresponds to the gap, no obvious dent is formed in the corresponding region of the flexible display. The first support surface can provide strong support for the flexible display.

"The support surface of the second support is spliced with a support surface of the second housing" is a case in which the support surface of the second support is connected to the support surface of the second housing, without a gap between the two. In another possible implementation, "the support surface of the second support is spliced with a support surface of the second housing" is a case in which the support surface of the second support is close to the support surface of the second housing, with a small gap between the two. In the case in which there is a small gap between the support surface of the second support and the support surface of the second housing, if a user presses a region that is of the flexible display and that corresponds to the gap, no obvious dent is formed in the corresponding region. The first support surface can provide strong support for the flexible display.

A case in which the first support surface is flush with the second support surface includes: both the first support surface and the second support surface are planes, and the first support surface and the second support surface are coplanar; or both the first support surface and the second support surface are planes, and the first support surface and the second support surface are parallel to each other and are slightly staggered; or the first support surface and the second support surface include planar parts that are close to each other and arc surface parts that are away from each other. The two planar parts are coplanar, or are parallel to each other and are slightly staggered. The two arc surface parts are used to bend two side edges of the flexible display, to have a 3D display effect.

In a possible implementation, the middle housing includes an outer cover, and the outer cover is bent to form inner space of the middle housing. When the first housing and the second housing are in the open state, the first support covers a part of the inner space of the middle housing, and the second support covers a part of the inner space of the middle housing. When the first housing and the second housing are in the closed state, the first support partially extends into the inner space of the middle housing, and the second support partially extends into the inner space of the middle housing.

In this implementation, when the folding apparatus is in the open state, the first support and the second support are close to each other, and a distance between the support surface of the first support and the support surface of the second support is relatively small, so that the rotation mechanism can provide relatively complete planar support for a bending part of the flexible display in the open state by using a two-plate structure.

In this implementation, when the folding apparatus is in the closed state, the first support and the second support partially extend into the inner space of the middle housing, a part of space that is located between the first support and the second support and that is in the inner space of the middle housing is released to form screen accommodating space, and the flexible display may partially extend into the inner space of the middle housing, thereby improving space utilization. In this way, components of the electronic device are arranged more compactly, thereby facilitating miniaturization of the electronic device.

In a possible implementation, the middle housing may further include two end covers. The two end covers are respectively fastened at two ends of the outer cover, and jointly enclose the inner space of the middle housing with the outer cover. The two end covers and the outer cover may be of an integrally-formed structure, or may be fastened to each other by assembling.

In a possible implementation, when the first housing and the second housing are in the open state, the support surface of the first support is spliced with the support surface of the second support to form support surfaces of a bending region.

In this implementation, the rotation mechanism of the folding apparatus can fully support the bending part of the flexible display by using the support surfaces of the bending region in the open state, so that the flexible display is not prone to have a problem such as a dent under pressing of the user. This helps improve a service life and reliability of the flexible display.

A case in which the support surface of the first support is spliced with the support surface of the second support may include a case in which the support surface of the first support is connected to the support surface of the second support, without a gap between the two, or may include a case in which the support surface of the first support is close to the support surface of the second support, with a small gap between the two. In the case in which there is a small gap between the support surface of the first support and the support surface of the second support, if a user presses a region that is of the flexible display and that corresponds to the gap, no obvious dent is formed in the corresponding region. The support surfaces of the bending region can provide strong support for the flexible display.

In a possible implementation, one or more notches may be disposed on a side that is of the first support and that faces the second support, and one or more notches may be disposed on a side that is of the second support and that faces the first support. The notches of the first support correspond to the notches of the second support. The notches are used to prevent the first support and the second support from interfering with another mechanical part of the rotation mechanism in a moving process of the folding apparatus, to implement avoidance and improve moving reliability of the rotation mechanism and the folding apparatus.

An area of the notch is also relatively small, and a region corresponding to the notch in the flexible display may be slightly indented under pressing of the user, instead of forming an obvious dent. In addition, in some implementations, a support plate or a stiffening plate that can be bent and has specific structural strength may be disposed on a side that is of the flexible display and that faces the folding apparatus, and the support plate or the stiffening plate covers at least the notch of the first support and the notch of the second support, to improve anti-pressing strength of the flexible display.

In a possible implementation, a first mounting groove is provided on a side that is of the first housing and that is close to the rotation mechanism, and the first support is mounted in the first mounting groove. A second mounting groove is provided on a side that is of the second housing and that is close to the rotation mechanism, and the second support is mounted in the second mounting groove. When the first housing and the second housing are in the open state, the middle housing is located in the first mounting groove and the second mounting groove, and the first housing and the second housing cover the outer cover. When the first housing and the second housing are in the closed state, the middle housing partially extends out of the first mounting groove and the second mounting groove, and the outer cover is exposed relative to the first housing and the second housing.

In this implementation, when the folding apparatus is in the open state, the first housing and the second housing can shield the middle housing, to implement self-shielding on a back side of the folding apparatus for protecting the middle housing. In addition, the folding apparatus and the electronic device are complete in appearance, with relatively good appearance experience, and relatively good waterproof and dustproof performance. In addition, when the folding apparatus is in the closed state, the first housing, the second housing, and the outer cover jointly form appearance parts of the folding apparatus and the electronic device. Therefore, the folding apparatus and the electronic device can implement back-side self-shielding in the closed state, which helps improve appearance integrity, and implements relatively good waterproof and dustproof performance. In other words, in a process of switching the folding apparatus between the open state and the closed state, the middle housing is gradually exposed or hidden relative to the first housing and the second housing, and the three cooperate with each other to implement back-side self-shielding of the folding apparatus and the electronic device. This improves appearance integrity and waterproof and dustproof performance.

In a possible implementation, the first mounting groove of the first housing may be designed as a stepped groove, including a first groove part with a relatively small depth and a second groove part with a relatively great depth. The first groove part of the first mounting groove may be configured to fasten a part of the first support, and the second groove part of the first mounting groove may be configured to accommodate a part of the first support and a part of the middle housing. The second mounting groove of the second housing may be designed as a stepped groove, including a first groove part with a relatively small depth and a second groove part with a relatively great depth. The first groove part of the second mounting groove may be configured to fasten a part of the second support, and the second groove part of the second mounting groove may be configured to accommodate a part of the second support and a part of the middle housing.

In a possible implementation, the outer cover includes a first curved part, a straight part, and a second curved part, and both the first curved part and the second curved part are arc-shaped and are separately connected to two sides of the straight part; or the outer cover is arc-shaped.

In this implementation, the outer cover forms an arc shape or a shape similar to an arc shape, which helps improve appearance experience and holding experience of the electronic device when the electronic device is in the closed state. In addition, a middle part of the outer cover is the straight part, so that a thickness of the outer cover is relatively small, and an overall thickness when the folding apparatus is in the open state is relatively small. This facilitates lightness and thinness of the electronic device. The thickness of the outer cover is a size of the outer cover in a direction perpendicular to the straight part.

In a possible implementation, when the first housing and the second housing are in the open state, the first support abuts against one side edge of the outer cover, and the second support abuts against the other side edge of the outer cover.

In this implementation, the outer cover can stop the first support and the second support when the folding apparatus is in the open state, to prevent the folding apparatus from being over-folded during unfolding. In this way, force applied to the flexible display is reduced and reliability of the flexible display and the electronic device is improved.

In a possible implementation, the middle housing further includes a first protrusion and a second protrusion, and both the first protrusion and the second protrusion are located in the inner space of the middle housing and fastened to the outer cover. The rotation mechanism further includes a first rotation shaft and a second rotation shaft. The first rotation shaft is inserted into the first support and the first protrusion, so that the first support is rotatably connected to the first protrusion. The second rotation shaft is inserted into the second support and the second protrusion, so that the second support is rotatably connected to the second protrusion.

In this implementation, a rotatable connection of a single-stage physical shaft is implemented between the first support and the middle housing by using the first rotation shaft, and a rotatable connection of the single-stage physical shaft is implemented between the second support and the middle housing by using the second rotation shaft. A single-stage physical shaft rotation mechanism among the first support, the second support and the middle housing forms a main moving mechanism of the folding apparatus. Because of a small quantity of parts, a simple part fitting relationship, a degree of freedom of 1, a short size chain, and a small accumulated error, the main moving mechanism of the rotation mechanism is high in control precision. This improves rotation precision of the folding apparatus, and helps improve use experience of the electronic device.

The first protrusion may connect the first curved part and the straight part of the outer cover, to improve structural strength of the outer cover. The second protrusion may connect the second curved part and the straight part of the outer cover, to improve structural strength of the outer cover.

In a possible implementation, a top of the first protrusion is embedded into the first support, and the first rotation shaft is inserted into the top of the first protrusion. The first support is provided with a first notch, and the top of the first protrusion is disposed in the first notch to be embedded into the first support. The first support is provided with a rotation shaft hole that communicates with the first notch, and the first rotation shaft is inserted into the rotation shaft hole. A rotation shaft hole is provided on the top of the first protrusion, and the first rotation shaft is inserted into the rotation shaft hole.

A top of the second protrusion is embedded into the second support, and the second rotation shaft is inserted into the top of the second protrusion. A rotation shaft hole is provided on the top of the second protrusion, and the second rotation shaft is inserted into the rotation shaft hole. The second support is provided with a second notch, and the top of the second protrusion is disposed in the second notch to be embedded into the second support. The second support is provided with a rotation shaft hole that communicates with the second notch, and the second rotation shaft is inserted into the rotation shaft hole. A rotation shaft hole is provided on the top of the second protrusion, and the second rotation shaft is inserted into the rotation shaft hole.

In this implementation, a location of a rotation shaft hole of the middle housing, a location of the rotation shaft hole of the first support, and a location of the rotation shaft hole of the second support are set, so that the middle housing may be rotatably connected to the first support by using the first rotation shaft, and the middle housing may be rotatably connected to the second support by using the second rotation shaft. That is, the middle housing may be rotatably connected to the first support and the second support by using physical shafts, with a reliable connection relationship, and a precise and stable rotation action.

In addition, an embedding relationship between the first protrusion and the first support may enable the first protrusion and the first support to limit each other in a direction parallel to a rotation center, thereby improving reliability of a rotatable connection structure. An embedding relationship between the second protrusion and the second support may also enable the second protrusion and the second support to limit each other in a direction parallel to the rotation center, thereby improving reliability of the rotatable connection structure.

In a possible implementation, the rotation mechanism further includes a synchronization assembly, and the synchronization assembly is configured to enable the first support and the second support to rotate synchronously in a movement process of the folding apparatus. In this implementation, the folding apparatus and the electronic device are relatively good in mechanism operation experience.

In a possible implementation, the synchronization assembly includes a first synchronous swing arm, a second synchronous swing arm, and a gear group. The first synchronous swing arm includes a rotation end and a movable end, the rotation end of the first synchronous swing arm is rotatably connected to the middle housing, the movable end of the first synchronous swing arm is movably connected to the first support, and in a process in which the first housing and the second housing are folded or unfolded relative to each other, the movable end of the first synchronous swing arm slides and rotates relative to the first support. The second synchronous swing arm includes a rotation end and a movable end, the rotation end of the second synchronous swing arm is rotatably connected to the middle housing, the movable end of the second synchronous swing arm is movably connected to the second support, and in the process in which the first housing and the second housing are folded or unfolded relative to each other, the movable end of the second synchronous swing arm slides and rotates relative to the second support. The rotation end of the second synchronous swing arm is engaged with the rotation end of the first synchronous swing arm by using the gear group.

In this implementation, in a process of unfolding and folding the folding apparatus, sliding and rotation actions of the first synchronous swing arm relative to the first support are symmetrical to sliding and rotation actions of the second synchronous swing arm relative to the second support, so that rotation actions of the first support and the second support relative to the middle housing are synchronous, that is, the first support and the second support are synchronously close to or away from each other. Therefore, rotation actions of the first housing and the second housing relative to the middle housing are good in synchronization, thereby improving mechanism operation experience of the folding apparatus and the electronic device.

In a possible implementation, the middle housing further includes a third protrusion, and the third protrusion is located in the inner space of the middle housing and fastened to the outer cover. The third protrusion may be provided with a mounting groove, and the mounting groove is approximately arc-shaped. A middle part of the mounting groove is further indented in a direction close to the straight part of the outer cover relative to two sides of the mounting groove. When the mounting groove is relatively deep, the mounting groove may alternatively be partially formed on the straight part of the outer cover. The mounting groove may include a plurality of groove parts that are sequentially connected, a bottom wall of each groove part is an arc surface, and a rotation groove may be provided on a side wall of each groove part. The third protrusion may connect the first curved part, the straight part, and the second curved part of the outer cover, to improve structural strength of the outer cover.

In a possible implementation, the middle housing further includes an inner cover, and the inner cover is fastened to the third protrusion. A quantity of inner covers is the same as a quantity of third protrusions. The inner cover has a protrusion part that is approximately arc-shaped, and the protrusion part includes a plurality of arc-shaped concave surfaces that are sequentially connected. The inner cover is fastened to the third protrusion, the protrusion part of the inner cover and the third protrusion jointly form arc-shaped movement space, and the movement space is used to mount the synchronization assembly. The movement space is approximately arc-shaped.

In a possible implementation, the gear group includes a plurality of gear shafts, the plurality of gear shafts are engaged with each other, and all the gear shafts are rotatably connected to the middle housing. The rotation end of the first synchronous swing arm, the plurality of gear shafts, and the rotation end of the second synchronous swing arm are arranged in an arc shape. The rotation end of the first synchronous swing arm, the plurality of gear shafts, and the rotation end of the second synchronous swing arm are disposed in the movement space of the middle housing. A rotation shaft at the rotation end of the first synchronous swing arm, rotation shafts of the plurality of gear shafts, and a rotation shaft at the rotation end of the second synchronous swing arm may be disposed in different rotation grooves.

In this implementation, the rotation end of the first synchronous swing arm, the plurality of gear shafts, and the rotation end of the second synchronous swing arm are arranged in the arc shape, that is, some structures that are of the synchronization assembly and that are mounted on the middle housing are arranged in the arc shape, so that bottom space of the inner space of the middle housing can be fully utilized, and top space of the inner space of the middle housing can be released to form screen accommodating space to accommodate a part of the flexible display when the electronic device is closed. In this way, compactness of component arrangement of the electronic device is improved, and a size of the electronic device is reduced.

In a possible implementation, the first support has a first sliding slot and a first limiting slot, and the first limiting slot communicates with the first sliding slot. The movable end of the first synchronous swing arm is disposed in the first sliding slot. The rotation mechanism further includes a first damping member, and the first damping member is disposed in the first limiting slot and partially extends into the first sliding slot. When the first housing and the second housing are in the open state, the first damping member abuts against the movable end of the first synchronous swing arm.

The second support has a second sliding slot and a second limiting slot, and the second limiting slot communicates with the second sliding slot. The movable end of the second synchronous swing arm is disposed in the second sliding slot. The rotation mechanism further includes a second damping member, and the second damping member is disposed in the second limiting slot and partially extends into the second sliding slot. When the first housing and the second housing are in the open state, the second damping member abuts against the movable end of the second synchronous swing arm.

In this implementation, the first damping member and the second damping member are configured to limit the synchronization assembly when the folding apparatus is in the open state, to limit the first support and the second support. In this way, the folding apparatus remains in the open state when no relatively large external force is applied, thereby improving use experience of a user. In addition, cooperation between the plurality of damping members and the synchronization assembly can also provide resistance in a process in which the electronic device is unfolded to the open state and folded to the closed state, so that the user can experience a better sense of mechanism operation.

In a possible implementation, the first damping member includes a holder and an elastic member. The holder includes a control part and an abutting part. One end of the elastic member is mounted on the control part of the holder, and the other end abuts against a slot wall of the first limiting slot. When the first housing and the second housing are in the open state, the abutting part of the holder clamps the movable end of the first synchronous swing arm.

In this implementation, the elastic member of the first damping member can deform under an external force, so that the first damping member can smoothly move between two sides of the rotation shaft of the movable end relative to the movable end of the first synchronous swing arm, thereby improving limiting reliability between the first damping member and the movable end of the first synchronous swing arm.

The first damping member may further include a buffer, and the buffer is mounted on the abutting part of the holder. The buffer may be made of a material (for example, rubber) with small stiffness, so that when being subjected to an external force, the buffer can absorb an impact force through deformation, thereby implementing buffering. Because the buffer is sleeved on the abutting part of the holder, the first damping member abuts against the movable end of the first synchronous swing arm by using the first buffer having a buffer function. This helps reduce a risk of wear of the holder of the first damping member and the movable end of the first synchronous swing arm in a long-time relative movement process, and improve limiting reliability of the first damping member, so that reliability of the rotation mechanism is higher.

In a possible implementation, a structure of the second damping member is the same as a structure of the first damping member, to simplify material types of the folding apparatus and reduce costs of the folding apparatus.

In a possible implementation, the first support is an integrally formed mechanical part, and the second support is an integrally formed mechanical part. In this implementation, because both the first support and the second support are integrally formed mechanical parts, a quantity of parts of the rotation mechanism is reduced and movement reliability of the rotation mechanism is improved. In some other implementations, the first support may alternatively be assembled by using a plurality of components to form an integrated structure, and the second support may alternatively be assembled by using a plurality of components to form an integrated structure.

In a possible implementation, the first support includes a first support plate, a first bump, and a second bump. The support surface of the first support is formed on the first support plate. The first support plate further includes a fastening surface, and the fastening surface is disposed opposite to the support surface of the first support plate. Both the first bump and the second bump are fastened to the fastening surface of the first support plate. A height of the first bump is less than a height of the second bump. The rotation shaft hole of the first support may be formed on the first support plate, or formed on the first bump. Disposing the first bump can not only reduce arrangement difficulty of the rotation shaft hole, but also avoid insufficient structural strength of a part that is of the first support and that is located around the rotation shaft hole. The first sliding slot and the first limiting slot of the first support may be formed on the second bump.

The second support includes a second support plate, a third bump, and a fourth bump. The support surface of the second support is formed on the second support plate. The second support plate further includes a fastening surface, and the fastening surface of the second support plate is disposed opposite to the support surface. Both the third bump and the fourth bump are fastened to the fastening surface of the second support plate. The rotation shaft hole of the second support may be formed on the second support plate, or formed on the third bump. Disposing the third bump can not only reduce arrangement difficulty of the rotation shaft hole, but also avoid insufficient structural strength of a part that is of the second support and that is located around the rotation shaft hole. The second sliding slot and the second limiting slot of the second support may be formed on the fourth bump.

In this implementation, the first support and the second support use the support plate as a base, and corresponding bumps are disposed at locations at which a connection structure needs to be disposed, to implement structure arrangement. This can simplify structures of the first support and the second support, reduce an overall weight, and improve strength of the connection structure.

In a possible implementation, the first housing includes a first body and two first baffle plates. The support surface of the first housing is located on the first body, and the two first baffle plates are respectively fastened to two sides of the first body and protrude relative to the support surface of the first housing. The first mounting groove is located in the first body, and the two first baffle plates may form a groove side wall of the first mounting groove. The first housing further includes a first back surface disposed opposite to the support surface. The first back surface is parallel to the support surface of the first housing. A height of the first baffle plate increases in a direction close to the rotation mechanism. The height of the first baffle plate is a size of the first baffle plate in a direction perpendicular to the first back surface.

The second housing includes a second body and two second baffle plates. The support surface of the second housing is located on the second body, and the two second baffle plates are respectively fastened to two sides of the second body and protrude relative to the support surface of the second housing. The second mounting groove is located in the second body, and the two second baffle plates may form a groove side wall of the second mounting groove. The second housing further includes a second back surface disposed opposite to the support surface. The second back surface is parallel to the support surface of the second housing. A height of the second baffle plate increases in a direction close to the rotation mechanism. The height of the second baffle plate is a size of the second baffle plate in a direction perpendicular to the second back surface.

In a possible implementation, when the first housing and the second housing are in the closed state, the first baffle plate is spliced with the second baffle plate, to jointly shield a gap between the first body and the second body. In this case, the folding apparatus and the electronic device implement appearance self-shielding. When the folding apparatus is in the closed state, a side that is of the first baffle plate and that is away from the first back surface is spliced with a side that is of the second baffle plate and that is away from the second back surface. The splicing includes a case in which the two sides abut against each other, or may include a case in which a small gap exists between the two sides.

In a possible implementation, when the folding apparatus is unfolded to the open state, the first body is spliced with the second body, and the first baffle plate is spliced with the second baffle plate. Therefore, an unfolding action of the folding apparatus can be stopped by splicing the first housing with the second housing, to prevent the folding apparatus from being over-folded during unfolding, thereby reducing force on the flexible display and improving reliability of the flexible display and the electronic device. In addition, the first back surface is flush with the second back surface, so that the electronic device is stably placed at a location such as a desktop, thereby improving user experience.

According to a second aspect, this application further provides an electronic device, including a flexible display and the folding apparatus according to any one of the foregoing implementations. The flexible display includes a first non-bending part, a bending part, and a second non-bending part that are sequentially arranged, the first non-bending part is fixedly connected to the support surface of the first housing, the second non-bending part is fixedly connected to the support surface of the second housing, and the bending part deforms in the process in which the first housing and the second housing are folded or unfolded relative to each other.

In this application, the electronic device implements screen inward folding by using the folding apparatus, and the electronic device may be bent. Because a main moving mechanism of the rotation mechanism of the folding apparatus is a single-stage rotatable connection mechanism among the first support, the second support and the middle housing, control precision of the main moving mechanism is high. The folding apparatus can drive the flexible display to accurately unfold and fold, so that user experience of the electronic device is relatively good.

That the first non-bending part is fixedly connected to the support surface of the first housing means that the first non-bending part and the support surface of the first housing are connected to each other, and after the connection, the first non-bending part is fastened relative to the support surface of the first housing (that is, a location relationship between the first non-bending part and the support surface of the first housing remains unchanged). That the second non-bending part is fixedly connected to the support surface of the second housing means that the second non-bending part and the support surface of the second housing are connected to each other, and after the connection, the second non-bending part is fastened relative to the support surface of the second housing (that is, a location relationship between the second non-bending part and the support surface of the second housing remains unchanged).

In a possible implementation, the first non-bending part is further fixedly connected to a partial region of the support surface of the first support, and the second non-bending part is further fixedly connected to a partial region of the support surface of the second support.

In this implementation, a fixed connection area (that is, an area of a region in which the first non-bending part and the first support surface are fastened relative to each other) between the first non-bending part of the flexible display and the first support surface of the folding apparatus is relatively large, and a fixed connection area between the second non-bending part and the second support surface of the folding apparatus is relatively large. Therefore, the folding apparatus is securely connected to a non-deformable part of the flexible display, and the flexible display can be better driven to unfold and fold.

That the first non-bending part is fixedly connected to a partial region of the support surface of the first support means that the first non-bending part is connected to the support surface of the first support, and after the connection, the first non-bending part is fastened relative to the partial region of the support surface of the first support (that is, a location relationship between the first non-bending part and the partial region of the support surface of the first support remains unchanged), and is movable relative to another partial region (that is, a location relationship between the first non-bending part and the another partial region of the support surface of the first support may change).

That the second non-bending part is fixedly connected to a partial region of the support surface of the second support means that the second non-bending part is connected to the support surface of the second support, and after the connection, the second non-bending part is fastened relative to the partial region of the support surface of the second support (that is, a location relationship between the second non-bending part and the partial region of the support surface of the second support remains unchanged), and is movable relative to another partial region (that is, a location relationship between the second non-bending part and the another partial region of the support surface of the second support may change).

In a possible implementation, the first non-bending part is bonded to the first housing by using an adhesive layer, and the second non-bending part is bonded to the second housing by using an adhesive layer. The first non-bending part is bonded to the first support by using an adhesive layer, and the second non-bending part is bonded to the second support by using an adhesive layer.

The adhesive layer located between the first non-bending part and the support surface of the first housing, the adhesive layer located between the first non-bending part and the support surface of the first support, the adhesive layer located between the second non-bending part and the support surface of the second housing, and the adhesive layer located between the second non-bending part and the support surface of the second support may be continuous entire adhesive layers, or may be dot-break adhesive layers, or may be adhesive layers having hollow-out regions.

DETAILED DESCRIPTION OF ILLUSTRATIVE EMBODIMENTS

The following describes embodiments of this application with reference to the accompanying drawings in embodiments of this application.

Embodiments of this application provide a folding apparatus and an electronic device. The electronic device includes a folding apparatus and a flexible display mounted on the folding apparatus. The folding apparatus may be unfolded to an open state, or may be folded to a closed state, or may be in an intermediate state between the open state and the closed state. The flexible display is unfolded and folded with the folding apparatus. The folding apparatus simplifies a part fitting relationship by reducing a quantity of pails of a main moving mechanism of the rotation mechanism, thereby reducing an accumulated transmission error and improving control precision of the rotation mechanism. Rotation precision of the folding apparatus is high, thereby helping improve user experience of the electronic device.

Figure 1:
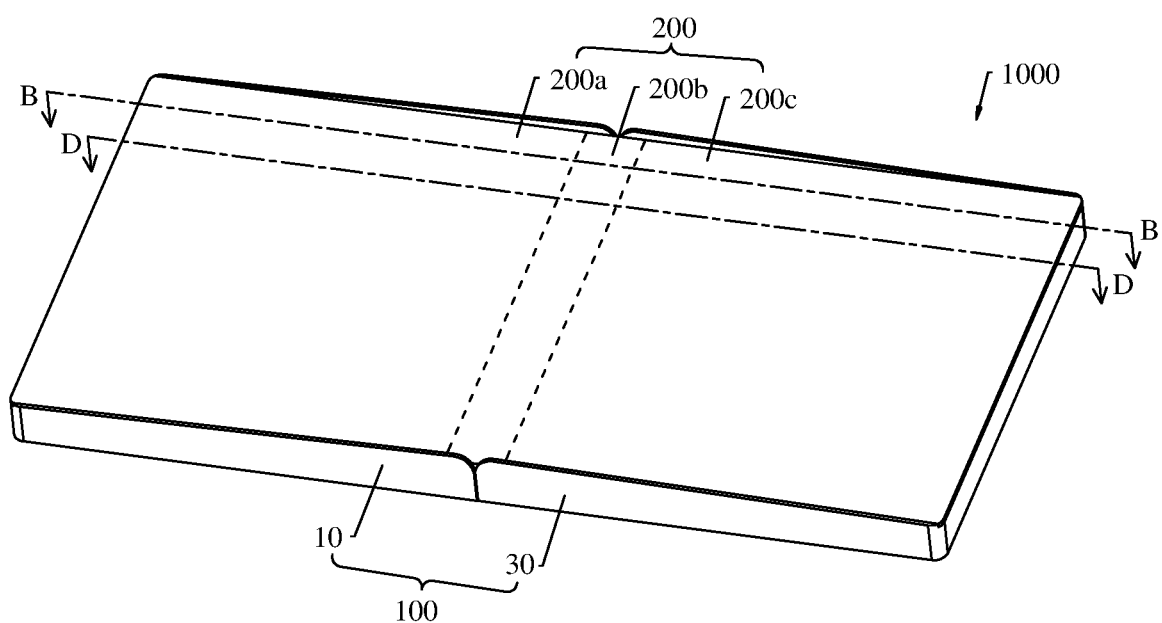
FIG. 1 is a schematic diagram of a structure of an electronic device in an open state according to an embodiment of this application.
Figure 2:
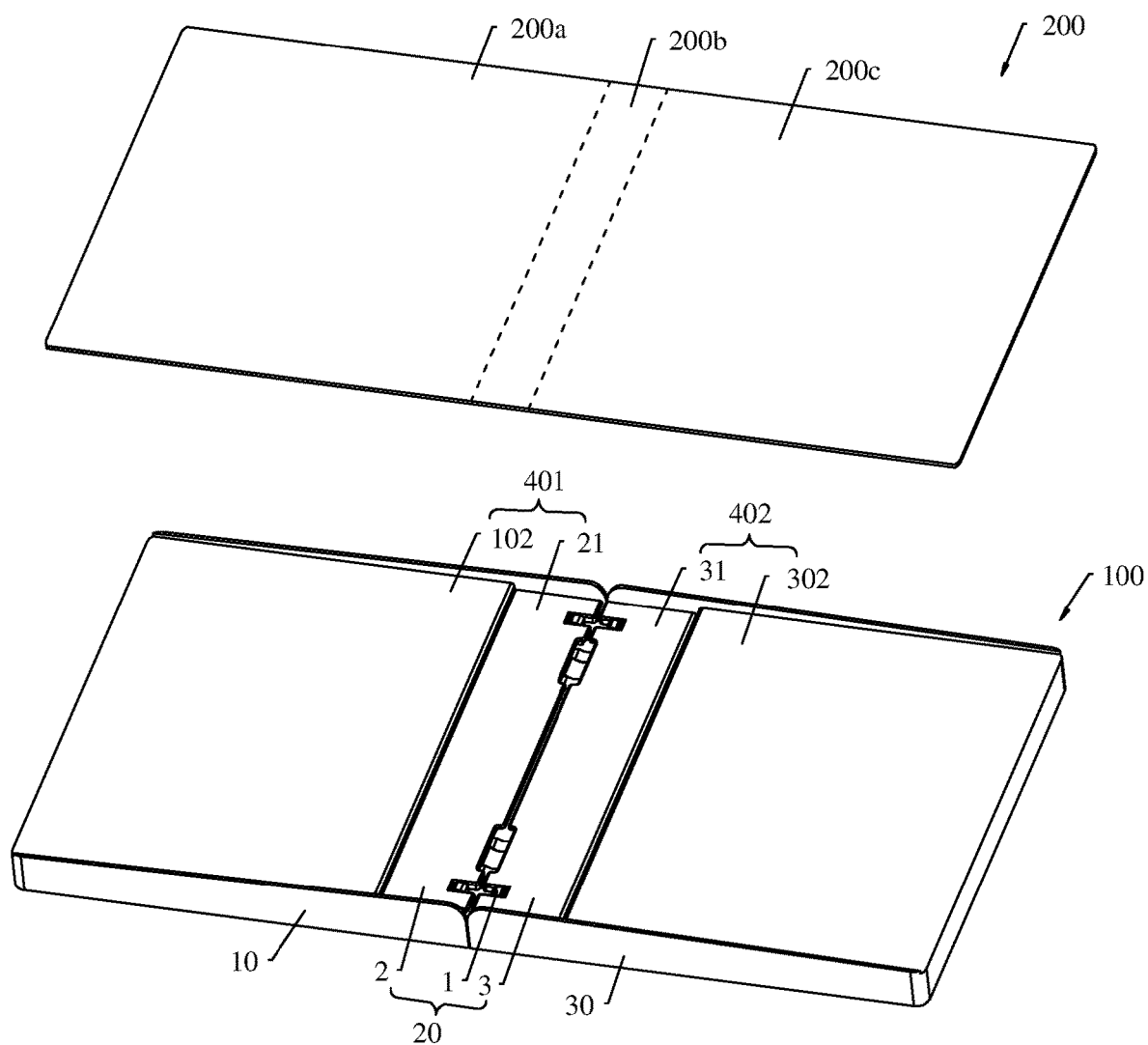
FIG. 2 is a schematic exploded view of a partial structure of a folding apparatus of the electronic device shown in FIG. 1.
Figure 3:
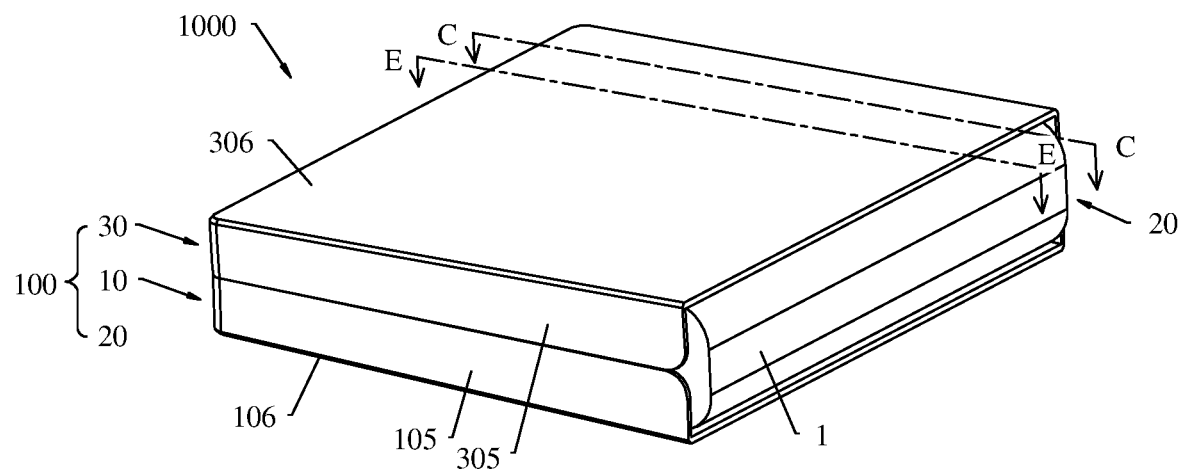
FIG. 3 is a schematic diagram of a structure of the electronic device shown in FIG. 1 in a closed state.

Refer to FIG. 1 to FIG. 3 together. FIG. 1 is a schematic diagram of a structure of an electronic device 1000 in an open state according to an embodiment of this application. FIG. 2 is a schematic exploded view of a partial structure of a folding apparatus 100 of the electronic device 1000 shown in FIG. 1. FIG. 3 is a schematic diagram of a structure of the electronic device 1000 shown in FIG. 1 in a closed state. The electronic device 1000 may be an electronic product such as a mobile phone, a tablet computer, or a notebook computer. This embodiment of this application is described by using an example in which the electronic device 1000 is a mobile phone.

The electronic device 1000 includes a folding apparatus 100 and a flexible display 200. The flexible display 200 is mounted on the folding apparatus 100. The flexible display 200 is configured to display an image, and the folding apparatus 100 is configured to drive the flexible display 200 to move. The folding apparatus 100 includes a first housing 10, a rotation mechanism 20, and a second housing 30 that are sequentially connected. The rotation mechanism 20 can deform, so that the first housing 10 and the second housing 30 are folded or unfolded relative to each other, that is, the folding apparatus 100 can be folded and unfolded.

As shown in FIG. 1, the first housing 10 and the second housing 30 may be unfolded relative to each other to an open state, that is, the folding apparatus 100 is in the open state, so that the electronic device 1000 is in the open state. In this case, the flexible display 200 is unfolded along with the folding apparatus 100 to be in a flat form. For example, when the first housing 10 and the second housing 30 are in the open state, the first housing 10 and the second housing 30 may be approximately in an angle of 180°. In some other embodiments, when the first housing 10 and the second housing 30 are in the open state, an angle between the first housing 10 and the second housing 30 may have a slight deviation relative to 180°, for example, 165°, 177°, or 185°.

As shown in FIG. 3, the first housing 10 and the second housing 30 may be folded relative to each other to a closed state, that is, the folding apparatus 100 is in the closed state, so that the electronic device 1000 is in the closed state. In this case, the flexible display 200 (not marked in FIG. 3) is folded along with the folding apparatus 100. The flexible display 200 is located on an inner side of the folding apparatus 100, and is wrapped by the folding apparatus 100.

The first housing 10 and the second housing 30 may alternatively be unfolded or folded relative to each other to an intermediate state, that is, the folding apparatus 100 is in the intermediate state, so that the electronic device 1000 is in the intermediate state. The intermediate state may be any state between an open state and a closed state. The flexible display 200 moves along with the folding apparatus 100.

In this embodiment, the flexible display 200 can be unfolded and folded with the folding apparatus 100. When the electronic device 1000 is in the open state, the flexible display 200 is in a flat form, and can perform full-screen display, so that the electronic device 1000 has a large display area, to improve viewing experience and operation experience of a user. When the electronic device 1000 is in the closed state, a plane size of the electronic device 1000 is small (with a small width size), so that it is convenient for a user to carry and receive the electronic device 1000.

It may be understood that this embodiment is described by using an example in which "a rotation center of the electronic device 1000 is parallel to a width direction of the electronic device 1000". In this case, the electronic device 1000 can rotate leftward and rightward, and folding and unfolding of the electronic device 1000 affect a width size of the electronic device 1000. In some other embodiments, a rotation center of the electronic device 1000 may alternatively be parallel to a length direction of the electronic device 1000. In this case, the electronic device 1000 can rotate up and down, and folding and unfolding of the electronic device 1000 affect a length size of the electronic device 1000.

In some embodiments, as shown in FIG. 1 and FIG. 2, the flexible display 200 includes a first non-bending part 200a, a bending part 200b, and a second non-bending part 200c that are sequentially arranged. The first non-bending part 200a is fixedly connected to the first housing 10, and the second non-bending part 200c is fixedly connected to the second housing 30. In a process in which the first housing 10 and the second housing 30 are folded or unfolded relative to each other, the bending part 200b deforms. For example, the first non-bending part 200a may be bonded to the first housing 10 by using an adhesive layer, and the second non-bending part 200c may be bonded to the second housing 30 by using an adhesive layer.

In some embodiments, the flexible display 200 may be an organic light-emitting diode (organic light-emitting diode, OLED) display, an active-matrix organic light-emitting diode (active-matrix organic light-emitting diode, AMOLED) display, a mini light-emitting diode (mini light-emitting diode) display, a micro light-emitting diode (micro light-emitting diode) display, a micro organic light-emitting diode (micro organic light-emitting diode) display, or a quantum dot light-emitting diode (quantum dot light-emitting diode, QLED) display.

In some embodiments, the electronic device 1000 may further include a plurality of modules (not shown in the figure), and the plurality of modules may be accommodated inside the folding apparatus 100. The plurality of modules of the electronic device 1000 may include but are not limited to a mainboard, a processor, a memory, a battery, a camera module, a speaker module, a microphone module, an antenna module, a sensor module, and the like. A quantity, types, locations, and the like of modules of the electronic device 1000 are not specifically limited in this embodiment of this application.

Figure 4:
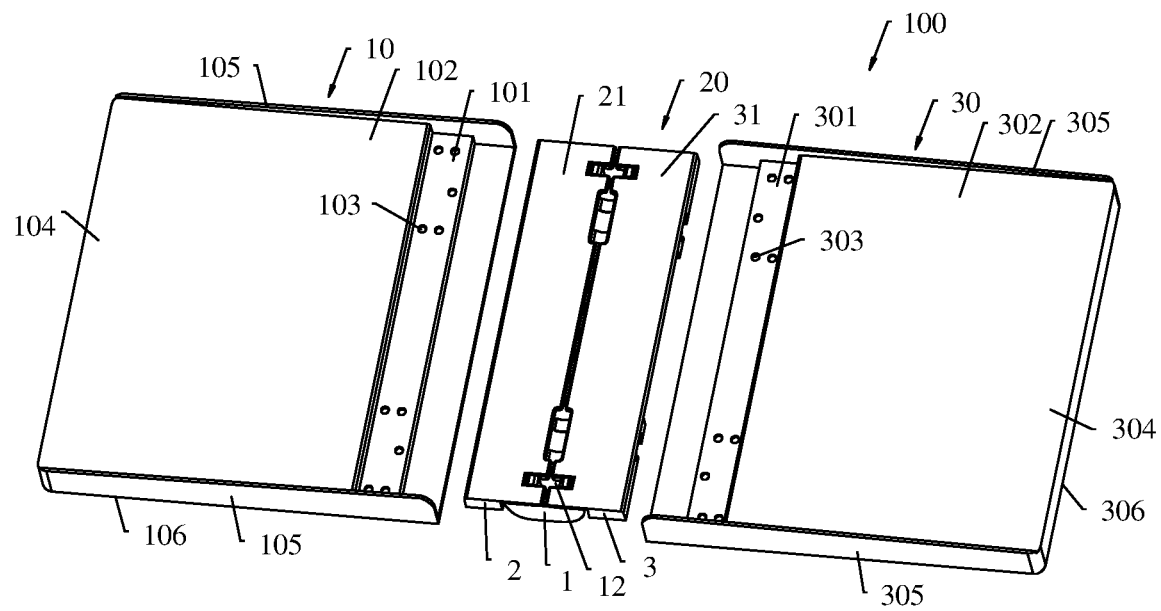
FIG. 4 is a schematic exploded view of a partial structure of the folding apparatus shown in FIG. 2.

Refer to FIG. 2 and FIG. 4 together. FIG. 4 is a schematic exploded view of a partial structure of the folding apparatus 100 shown in FIG. 2.

In some embodiments, the rotation mechanism 20 includes a middle housing 1, a first support 2, and a second support 3. One end of the first support 2 is connected to the middle housing 1, and the other end is fixedly connected to the first housing 10. One end of the second support 3 is connected to the middle housing 1, and the other end is fixedly connected to the second housing 30. For example, a first mounting groove 101 is disposed on a side that is of the first housing 10 and that is close to the rotation mechanism 20, and the first support 2 is mounted in the first mounting groove 101, to fixedly connect to the first housing 10. A second mounting groove 301 is disposed on a side that is of the second housing 30 and that is close to the rotation mechanism 20, and the second support 3 is mounted in the second mounting groove 301, to fixedly connect to the second housing 30.

In some embodiments, the first housing 10 includes a support surface 102 configured to carry the flexible display 200, and the first support 2 includes a support surface 21 configured to carry the flexible display 200. The support surface 21 of the first support 2 is spliced with the support surface 102 of the first housing 10 to form a first support surface 401. It may be understood that a case in which the support surface 21 of the first support 2 is spliced with the support surface 102 of the first housing 10 may include a case in which the support surface 21 of the first support 2 is connected to the support surface 102 of the first housing 10, with no gap between the two, or may include a case in which the support surface 21 of the first support 2 is close to the support surface 102 of the first housing 10, with a small gap between the two. In the case in which there is a small gap between the support surface 21 of the first support 2 and the support surface 102 of the first housing 10, if a user presses a region that is of the flexible display 200 and that corresponds to the gap, no obvious dent is formed in the corresponding region of the flexible display 200. The first support surface 401 can provide strong support for the flexible display 200.

The second housing 30 includes a support surface 302 configured to carry the flexible display 200, and the second support 3 includes a support surface 31 configured to carry the flexible display 200. The support surface 31 of the second support 3 is spliced with the support surface 302 of the second housing 30 to form a second support surface 402. It may be understood that a case in which the support surface 31 of the second support 3 is spliced with the support surface 302 of the second housing 30 may include a case in which the support surface 31 of the second support 3 is connected to the support surface 302 of the second housing 30, with no gap between the two, or may include a case in which the support surface 31 of the second support 3 is close to the support surface 302 of the second housing 30, with a small gap between the two. In the case in which there is a small gap between the support surface 31 of the second support 3 and the support surface 302 of the second housing 30, if the user presses a region that is of the flexible display 200 and that corresponds to the small gap, no obvious dent is formed in the corresponding region of the flexible display 200. The second support surface 402 can provide strong support for the flexible display 200.

In some embodiments, as shown in FIG. 2, the first non-bending part 200a of the flexible display 200 is fixedly connected to the support surface 102 of the first housing 10, and may further be fixedly connected to a partial region of the support surface 21 of the first support 2. For example, the first non-bending part 200a may be bonded to the first housing 10 by using an adhesive layer, and may be bonded to the first support 2 by using an adhesive layer. That the first non-bending part 200a is fixedly connected to the support surface 102 of the first housing 10 means that the first non-bending part 200a and the support surface 102 of the first housing 10 are connected to each other, and after the connection, the first non-bending part 200a is fastened relative to the support surface 102 of the first housing 10 (that is, a location relationship between the first non-bending part 200a and the support surface 102 of the first housing 10 remains unchanged). That the first non-bending part 200a is fixedly connected to a partial region of the support surface 21 of the first support 2 means that the first non-bending part 200a is connected to the support surface 21 of the first support 2, and after the connection, the first non-bending part 200a is fastened relative to the partial region of the support surface 21 of the first support 2 (that is, a location relationship between the first non-bending part 200a and the partial region of the support surface 21 of the first support 2 remains unchanged), and is movable relative to another partial region (that is, a location relationship between the first non-bending part 200a and the another partial region of the support surface 21 of the first support 2 may change).

The second non-bending part 200c of the flexible display 200 is fixedly connected to the support surface 302 of the second housing 30, and may further be fixedly connected to a partial region of the support surface 31 of the second support 3. For example, the second non-bending part 200c may be bonded to the second housing 30 by using an adhesive layer, and may be bonded to the second support 3 by using an adhesive layer. That the second non-bending part 200c is fixedly connected to the support surface 302 of the second housing 30 means that the second non-bending part 200c and the support surface 302 of the second housing 30 are connected to each other, and after the connection, the second non-bending part 200c is fastened relative to the support surface 302 of the second housing 30 (that is, a location relationship between the second non-bending part 200c and the support surface 302 of the second housing 30 remains unchanged). That the second non-bending part 200c is fixedly connected to a partial region of the support surface 31 of the second support 3 means that the second non-bending part 200c is connected to the support surface 31 of the second support 3, and after the connection, the second non-bending part 200c is fastened relative to the partial region of the support surface 31 of the second support 3 (that is, a location relationship between the second non-bending part 200c and the partial region of the support surface 31 of the second support 3 remains unchanged), and is movable relative to another partial region (that is, a location relationship between the second non-bending part 200c and the another partial region of the support surface 31 of the second support 3 may change).

In this embodiment, a fixed connection area (that is, an area of a region in which the first non-bending part 200a and the first support surface 401 are fastened relative to each other) between the first non-bending part 200a of the flexible display 200 and the first support surface 401 of the folding apparatus 100 is relatively large, and a fixed connection area between the second non-bending part 200c and the second support surface 402 of the folding apparatus 100 is relatively large. Therefore, the folding apparatus 100 is securely connected to a non-deformable part of the flexible display 200, and the flexible display 200 can be better driven to unfold and fold.

The adhesive layer located between the first non-bending part 200a and the support surface 102 of the first housing 10, the adhesive layer located between the first non-bending part 200a and the support surface 21 of the first support 2, the adhesive layer located between the second non-bending part 200c and the support surface 302 of the second housing 30, and the adhesive layer located between the second non-bending part 200c and the support surface 31 of the second support 3 may be continuous entire adhesive layers, or may be dot-break adhesive layers, or may be adhesive layers having hollowed-out regions. A specific solution of the adhesive layer is not strictly limited in this embodiment of this application.

In some embodiments, as shown in FIG. 2, the support surface 21 of the first support 2 is flush with the support surface 102 of the first housing 10, so that the first support surface 401 can provide flat strong support for the flexible display 200, thereby improving user experience such as a touch operation and picture viewing of a user. For example, both the support surface 21 of the first support 2 and the support surface 102 of the first housing 10 are planes, and are coplanar, and the first support surface 401 is a plane, to better support the flexible display 200. In this case, the adhesive layer between the flexible display 200 and the support surface 21 of the first support 2 may be as thick as the adhesive layer between the flexible display 200 and the support surface 102 of the first housing 10.

It can be understood that when the support surface 21 of the first support 2 and the support surface 102 of the first housing 10 are parallel to each other and are slightly staggered, after the flexible display 200 is fastened to the first support surface 401 by a slight difference between a thickness of the adhesive layer between the flexible display 200 and the support surface 21 of the first support 2 and a thickness of the adhesive layer between the flexible display 200 and the support surface 102 of the first housing 10, the corresponding region of the flexible display 200 is still a planar region. In this case, it is also considered that the support surface 21 of the first support 2 is flush with the support surface 102 of the first housing 10.

In some other embodiments, there may be no fixed connection relationship between the first non-bending part 200a of the flexible display 200 and the support surface 21 of the first support 2, that is, there is no connection adhesive layer between the first non-bending part 200a of the flexible display 200 and the support surface 21 of the first support 2, and the two may be in direct contact. In this case, the support surface 21 of the first support 2 and the support surface 102 of the first housing 10 are parallel to each other, and the support surface 21 of the first support 2 slightly protrudes relative to the support surface 102 of the first housing 10, so that the flexible display 200 can still obtain planar support. In this case, it is also considered that the support surface 21 of the first support 2 is flush with the support surface 102 of the first housing 10.

In some other embodiments, the support surface 102 of the first housing 10 may include a planar part close to the first support 2 and an arc surface part far from the first support 2, and the support surface 21 of the first support 2 is a plane. The support surface 21 of the first support 2 and the planar part of the support surface 102 of the first housing 10 are coplanar, or are parallel to each other and are slightly staggered. In this case, it is also considered that the support surface 21 of the first support 2 is flush with the support surface 102 of the first housing 10. In this embodiment, the first support surface 401 may support the flexible display 200 to present a 3D display effect.

For related designs of the support surface 31 of the second support 3, the support surface 302 of the second housing 30, a connection relationship among the support surface 31 of the second support 3, the support surface 302 of the second housing 30, and the second non-bending part 200c of the flexible display 200, and the like, refer to the technical solutions of the support surface 21 of the first support 2, the support surface 102 of the first housing 10, and the connection relationship among the support surface 21 of the first support 2, the support surface 102 of the first housing 10, and the first non-bending part 200a of the flexible display 200. Details are not described in this application.

In some embodiments, as shown in FIG. 2, when the first housing 10 and the second housing 30 are unfolded relative to each other to an open state, the first support 2 and the second support 3 are close to each other, and the first support surface 401 is flush with the second support surface 402. In this case, the first support surface 401 and the second support surface 402 can provide planar support for the flexible display 200, so that the flexible display 200 is flat and can perform large-area display.

A case in which the first support surface 401 is flush with the second support surface 402 includes: both the first support surface 401 and the second support surface 402 are planes, and the first support surface 401 and the second support surface 402 are coplanar; or both the first support surface 401 and the second support surface 402 are planes, and the first support surface 401 and the second support surface 402 are parallel to each other and are slightly staggered. The first support surface 401 and the second support surface 402 include planar parts that are close to each other and arc surface parts that are away from each other. The two planar parts are coplanar, or are parallel to each other and are slightly staggered. The two arc surface parts are used to bend two side edges of the flexible display 200, to have a 3D display effect.

Figure 5:
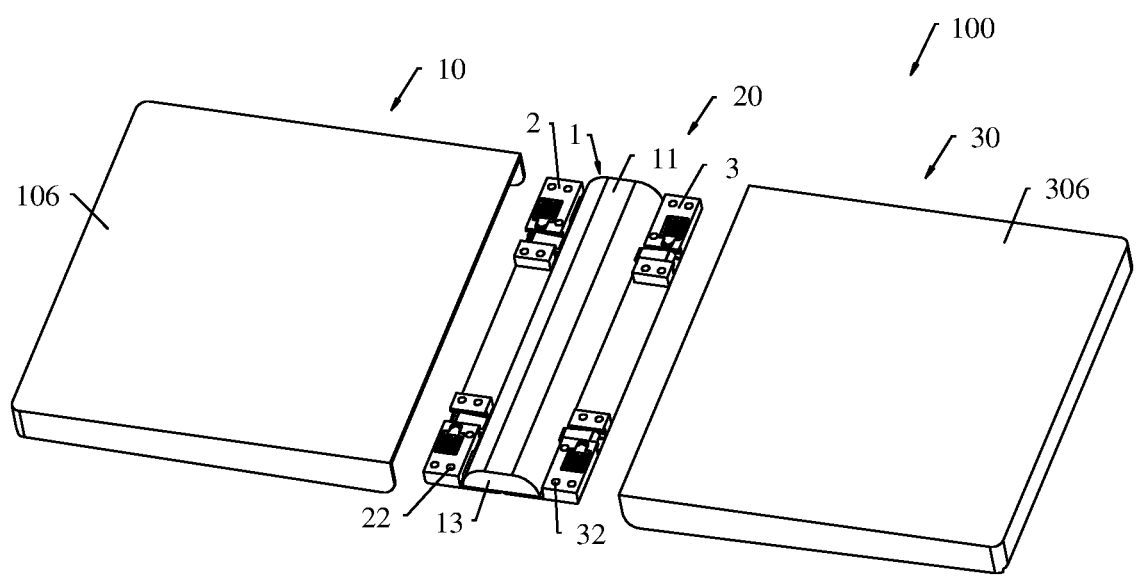
FIG. 5 is a schematic diagram of a structure of the folding apparatus shown in FIG. 4 from another angle.

Refer to FIG. 4 and FIG. 5 together. FIG. 5 is a schematic diagram of a structure of the folding apparatus 100 shown in FIG. 4 from another angle. An angle of view of the folding apparatus 100 shown in FIG. 5 is reversed relative to an angle of view of the folding apparatus 100 shown in FIG. 4.

In some embodiments, the middle housing 1 includes an outer cover 11, and the outer cover 11 is bent to form inner space 12 of the middle housing 1. The middle housing 1 may further include two end covers 13. The two end covers 13 are respectively fastened at two ends of the outer cover 11, and jointly enclose the inner space 12 of the middle housing 1 with the outer cover 11. For example, the two end covers 13 and the outer cover 11 may be of an integrally-formed structure, or may be fastened to each other by assembling.

As shown in FIG. 4, when the first housing 10 and the second housing 30 are in an open state, the first support 2 covers a part of the inner space 12 of the middle housing 1, and the second support 3 covers a part of the inner space 12 of the middle housing 1. In this case, the first support 2 and the second support 3 are close to each other, a distance between the support surface 21 of the first support 2 and the support surface 31 of the second support 3 is relatively small, and the rotation mechanism 20 can provide relatively complete planar support for the bending part 200b of the flexible display 200 in the open state by using a two-plate structure.

For example, when the first housing 10 and the second housing 30 are in the open state, the support surface 21 of the first support 2 is spliced with the support surface 31 of the second support 3 to form the support surfaces (21 and 31) of a bending region. In this case, the rotation mechanism 20 of the folding apparatus 100 can fully support the bending part 200b of the flexible display 200 by using the support surfaces (21 and 31) of the bending region in the open state, so that the flexible display 200 is not prone to have a problem such as a dent under pressing of the user. This helps improve a service life and reliability of the flexible display 200.

It may be understood that a case in which the support surface 21 of the first support 2 is spliced with the support surface 31 of the second support 3 may include a case in which the support surface 21 of the first support 2 is connected to the support surface 31 of the second support 3, with no gap between the two, or may include a case in which the support surface 21 of the first support 2 is close to the support surface 31 of the second support 3, with a small gap between the two. In the case in which there is a small gap between the support surface 21 of the first support 2 and the support surface 31 of the second support 3, if a user presses a region that is of the flexible display 200 and that corresponds to the gap, no obvious dent is formed in the corresponding region of the flexible display 200. The support surfaces (21 and 31) of the bending region can provide strong support for the flexible display 200.

One or more notches may be disposed on a side that is of the first support 2 and that faces the second support 3 (for detailed description, refer to the following), and one or more notches may be disposed on a side that is of the second support 3 and that faces the first support 2 (for detailed description, refer to the following). The notches of the first support 2 correspond to the notches of the second support 3. The notches are used to prevent the first support 2 and the second support 3 from interfering with another mechanical part of the rotation mechanism 20 in a moving process of the folding apparatus 100, to implement avoidance and improve moving reliability of the rotation mechanism 20 and the folding apparatus 100.

It may be understood that an area of the notch is also relatively small, and a region corresponding to the notch in the flexible display 200 may be slightly indented under pressing of the user, instead of forming an obvious dent. In addition, in some embodiments, a support plate or a stiffening plate that can be bent and has specific structural strength may be disposed on a side that is of the flexible display 200 and that faces the folding apparatus 100, and the support plate or the stiffening plate covers at least the notch of the first support 2 and the notch of the second support 3, to improve anti-pressing strength of the flexible display 200.

As shown in FIG. 4 and FIG. 5, when the first housing 10 and the second housing 30 are in the open state, the first support 2 partially extends out of the middle housing 1, and this part is fixedly connected to the first housing 10, and the second support 3 partially extends out of the middle housing 1, and this part is connected to the second housing 30. For example, a fastening hole 22 is provided on the part that is of the first support 2 and that extends out of the middle housing 1, a fastening hole 103 is provided on a groove wall of the first mounting groove 101 of the first housing 10, and the first support 2 and the first housing 10 may be fixedly connected to each other by using a fastener. A fastening hole 32 is provided on the part that is of the second support 3 and that extends out of the middle housing 1, a fastening hole 303 is provided on a groove wall of the second mounting groove 301 of the second housing 30, and the second support 3 and the second housing 30 may be fixedly connected to each other by using a fastener. In some other embodiments, the first housing 10 and the second housing 30, and the second support 3 and the second housing 30 may also be fastened to each other by welding, bonding, or the like.

Refer to FIG. 4 and FIG. 5 again. The first housing 10 includes a first body 104 and two first baffle plates 105. A support surface 102 of the first housing 10 is located on the first body 104. The two first baffle plates 105 are respectively fastened to two sides of the first body 104 and protrude relative to the support surface 102 of the first housing 10. The first mounting groove 101 is located in the first body 104, and the two first baffle plates 105 may form a groove side wall of the first mounting groove 101. The first housing 10 further includes a first back surface 106 disposed opposite to the support surface 102. For example, the first back surface 106 is parallel to the support surface 102. In an embodiment, a height of the first baffle plate 105 increases in a direction close to the rotation mechanism 20. The height of the first baffle plate 105 is a size of the first baffle plate 105 in a direction perpendicular to the first back surface 106.

The second housing 30 includes a second body 304 and two second baffle plates 305. The support surface 302 of the second housing 30 is located on the second body 304. The two second baffle plates 305 are respectively fastened to two sides of the second body 304 and protrude relative to the support surface 302 of the second housing 30. The second mounting groove 301 is located in the second body 304, and the two second baffle plates 305 may form a groove side wall of the second mounting groove 301. The second housing 30 further includes a second back surface 306 disposed opposite to the support surface 302. For example, the second back surface 306 is parallel to the support surface 302. In an embodiment, a height of the second baffle plate 305 increases in a direction close to the rotation mechanism 20. The height of the second baffle plate 305 is a size of the second baffle plate 305 in a direction perpendicular to the second back surface 306.

Figure 6:
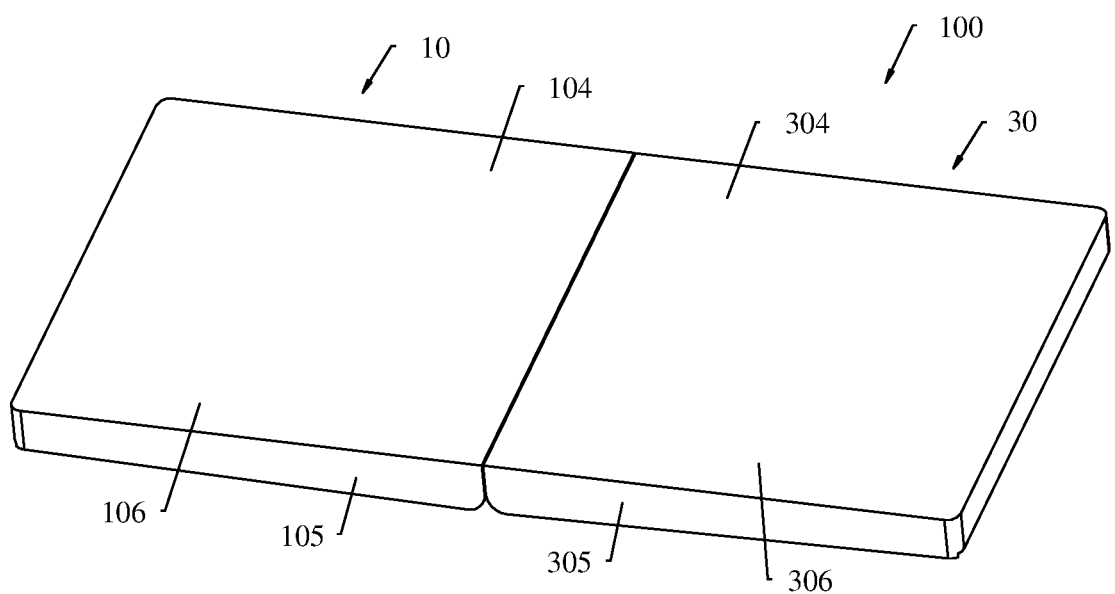
FIG. 6 is a schematic diagram of a structure of the folding apparatus shown in FIG. 2 from another angle.

Refer to FIG. 4 and FIG. 6 together. FIG. 6 is a schematic diagram of a structure of the folding apparatus 100 shown in FIG. 2 from another angle. An angle of view of the folding apparatus 100 shown in FIG. 6 is reversed relative to an angle of view of the folding apparatus 100 shown in FIG. 2.

In some embodiments, when the first housing 10 and the second housing 30 are in the open state, the middle housing 1 is located in the first mounting groove 101 and the second mounting groove 301, and the first housing 10 and the second housing 30 cover the outer cover 11. An end at which the first mounting groove 101 is provided of the first body 104 is spliced with an end at which the second mounting groove 301 is provided of the second body 304. The two first baffle plates 105 are separately spliced with the two second baffle plates 305, and an end that is of the first baffle plate 105 and that is close to the first mounting groove 101 is spliced with an end that is of the second baffle plate 305 and that is close to the second mounting groove 301. The first back surface 106 and the second back surface 306 are flush and spliced. The first body 104 and the second body 304 shield the middle housing 1 on a back side of the folding apparatus 100 (a front side of the folding apparatus 100 is a side supporting the flexible display 200), a pair of first baffle plates 105 and second baffle plates 305 shield the middle housing 1 on a top of the folding apparatus 100, and the other pair of first baffle plates 105 and second baffle plates 305 shield the middle housing 1 on a bottom of the folding apparatus 100.

In this embodiment, the first housing 10 and the second housing 30 can shield the middle housing 1 in the open state, to implement self-shielding on a back side of the folding apparatus 100 for protecting the middle housing 1. In addition, the folding apparatus 100 and the electronic device 1000 are complete appearance, with relatively good appearance experience, and relatively good waterproof and dust-proof performance. In addition, when the folding apparatus 100 is unfolded to the open state, the first body 104 is spliced with the second body 304, and the first baffle plate 105 is spliced with the second baffle plate 305. Therefore, an unfolding action of the folding apparatus 100 can be stopped by splicing the first housing 10 with the second housing 30, to prevent the folding apparatus 100 from being over-folded during unfolding, thereby reducing force on the flexible display 200 and improving reliability of the flexible display 200 and the electronic device 1000. In addition, the first back surface 106 is flush with the second back surface 306, so that the electronic device 1000 is stably placed at a location such as a desktop, thereby improving user experience.

The splicing of the first body 104 and the second body 304 includes a case in which the first body 104 and the second body 304 abut against each other, or may include a case in which there is a small gap between the first body 104 and the second body 304. The splicing of the first baffle plate 105 and the second baffle plate 305 includes a case in which the first baffle plate 105 and the second baffle plate 305 abut against each other, or may include a case in which there is a small gap between the first baffle plate 105 and the second baffle plate 305. The splicing of the first back surface 106 and the second back surface 306 includes a case in which the first back surface 106 and the second back surface 306 are connected, or may include a case in which there is a small gap between the first back surface 106 and the second back surface 306.

In some embodiments, as shown in FIG. 4, the first mounting groove 101 of the first housing 10 may be designed as a stepped groove, including a first groove part with a relatively small depth and a second groove part with a relatively great depth. The first groove part of the first mounting groove 101 may be configured to fasten a part of the first support 2, and the second groove part of the first mounting groove 101 may be configured to accommodate a part of the first support 2 and a part of the middle housing 1. The second mounting groove 301 of the second housing 30 may be designed as a stepped groove, including a first groove part with a relatively small depth and a second groove part with a relatively great depth. The first groove part of the second mounting groove 301 may be configured to fasten a part of the second support 3, and the second groove part of the second mounting groove 301 may be configured to accommodate a part of the second support 3 and a part of the middle housing 1.

Refer to FIG. 3 and FIG. 4 again. In some embodiments, when the first housing 10 and the second housing 30 are in a closed state, the middle housing 1 partially extends out of the first mounting groove 101 and the second mounting groove 301, and the outer cover 11 is exposed relative to the first housing 10 and the second housing 30. In this embodiment, the first housing 10, the second housing 30, and the outer cover 11 jointly form appearance parts of the folding apparatus 100 of the electronic device 1000. Therefore, the folding apparatus 100 and the electronic device 1000 can implement back-side self-shielding in the closed state, which helps improve appearance integrity, and implements relatively good waterproof and dustproof performance. As shown in FIG. 3, when the folding apparatus 100 and the electronic device 1000 are in the closed state, a thickness increases in a direction close to the rotation mechanism 20.

For example, when the first housing 10 and the second housing 30 are in the closed state, the first baffle plate 105 is spliced with the second baffle plate 305, to jointly shield a gap between the first body 104 and the second body 304. In this case, the folding apparatus 100 and the electronic device 1000 in the closed state can be completely closed. This not only improves appearance experience, but also improves waterproof and dustproof performance.

When the folding apparatus 100 is in the closed state, a side that is of the first baffle plate 105 and that is away from the first back surface 106 is spliced with a side that is of the second baffle plate 305 and that is away from the second back surface 306. The splicing includes a case in which the two sides abut against each other, or may include a case in which a small gap exists between the two sides.

It may be understood that the plurality of components of the first housing 10 may be integrally formed, or may be fastened to each other by assembling. The plurality of components of the second housing 30 may be integrally formed, or may be fastened to each other by assembling. Specific components, processing manners, and the like of the first housing 10 and the second housing 30 are not strictly limited in this embodiment of this application.

Figure 7:
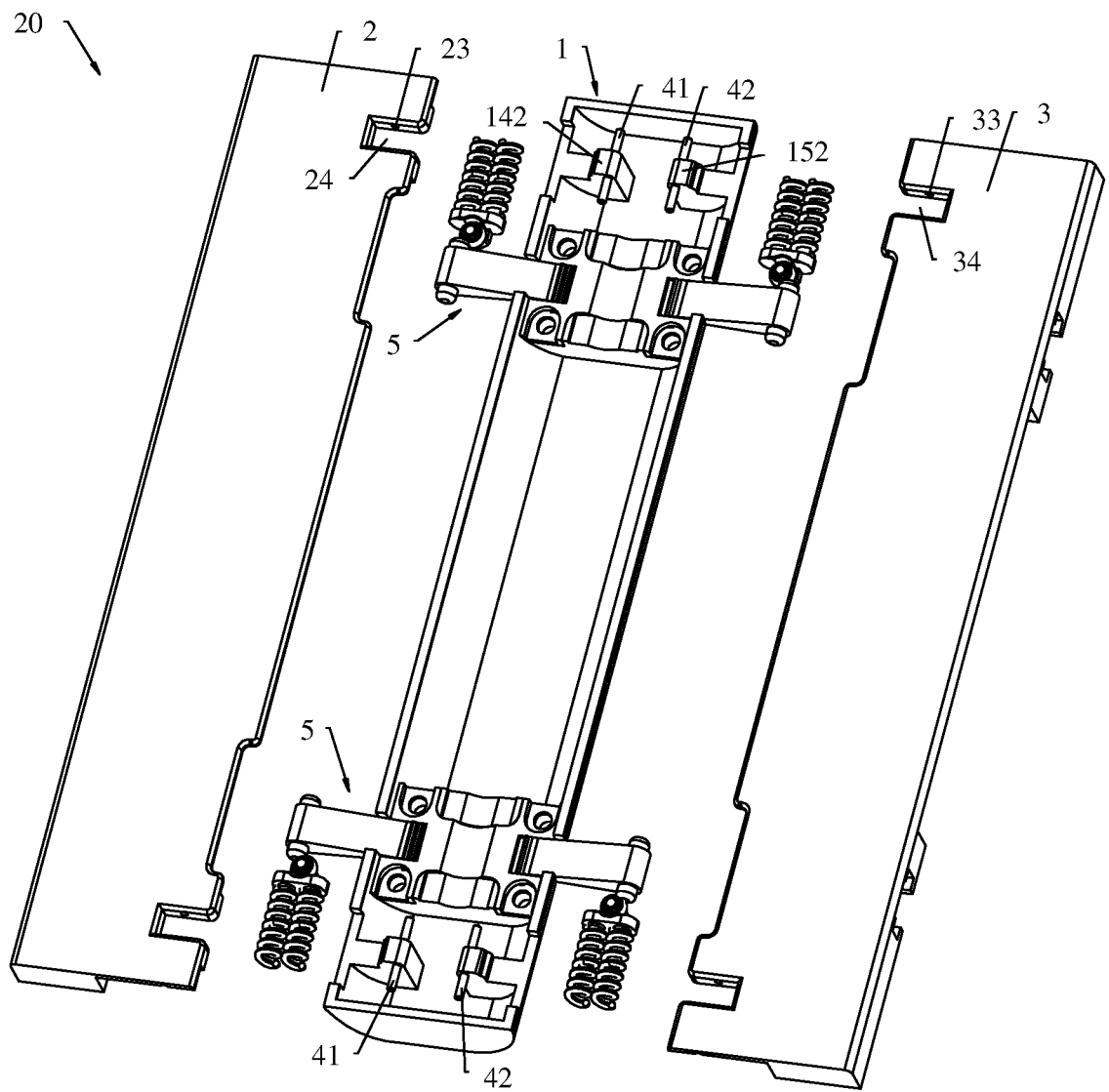
FIG. 7 is a schematic exploded view of a partial structure of the rotation mechanism shown in FIG. 4.
Figure 8:
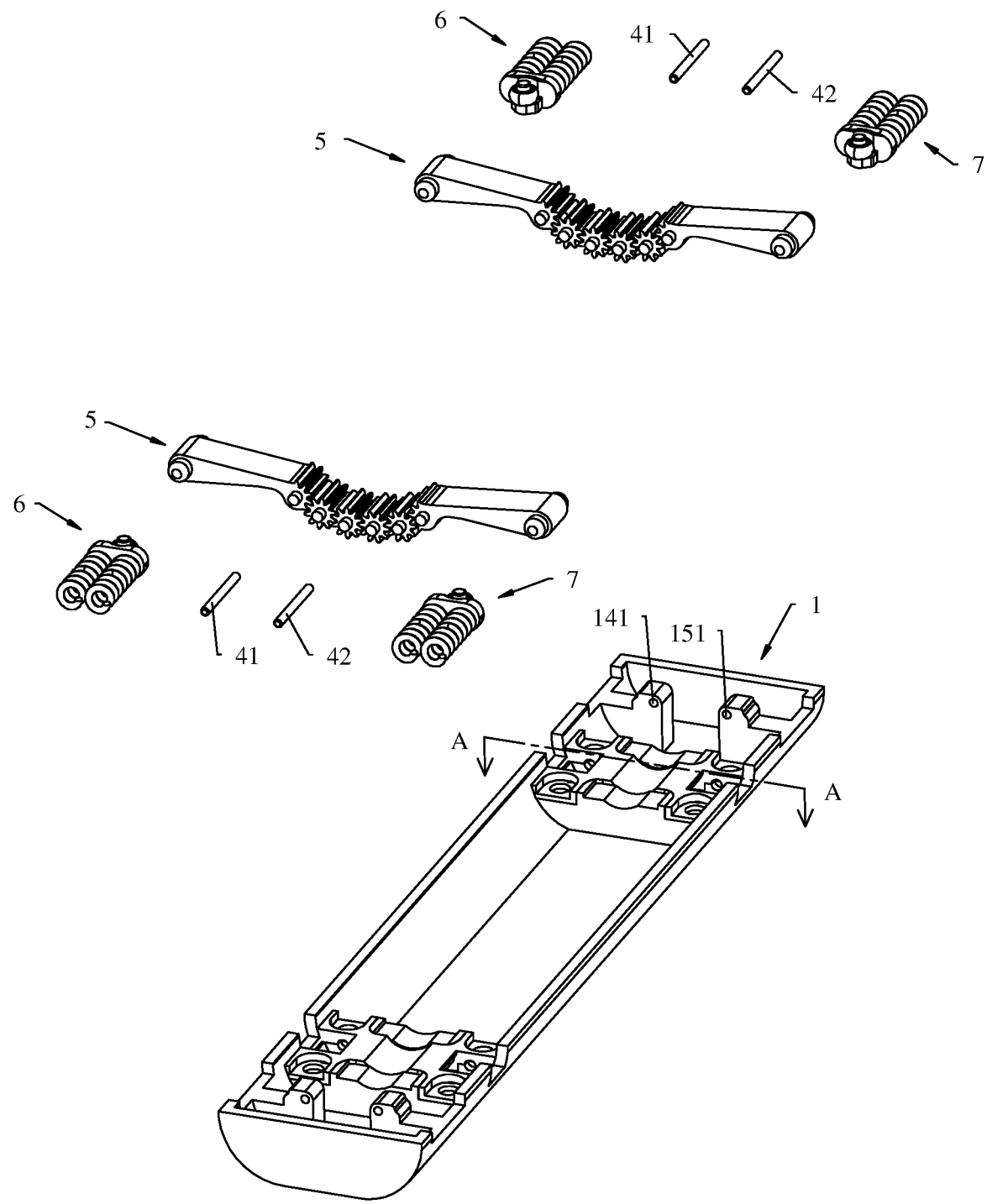
FIG. 8 is a schematic exploded view of a partial structure of the rotation mechanism shown in FIG. 7.

Refer to FIG. 7 and FIG. 8 together. FIG. 7 is a schematic exploded view of a partial structure of the rotation mechanism 20 shown in FIG. 4. FIG. 8 is a schematic exploded view of a partial structure of the rotation mechanism 20 shown in FIG. 7.

In some embodiments, as shown in FIG. 7 and FIG. 8, the rotation mechanism 20 further includes a first rotation shaft 41 and a second rotation shaft 42. With reference to FIG. 2 and FIG. 7, the first rotation shaft 41 is inserted into the middle housing 1 and the first support 2, and the second rotation shaft 42 is inserted into the middle housing 1 and the second support 3. In this case, one end of the first support 2 is rotatably connected to the middle housing 1 by using the first rotation shaft 41, the other end of the first support 2 is fixedly connected to the first housing 10, one end of the second support 3 is rotatably connected to the middle housing 1 by using the second rotation shaft 42, and the other end of the second support 3 is fixedly connected to the second housing 30. A single-stage physical shaft rotation mechanism 20 among the first support 2, the second support 3 and the middle housing 1 forms a main moving mechanism of the folding apparatus 100. Because of a small quantity of parts, a simple part fitting relationship, a degree of freedom of 1, a short size chain, and a small accumulated error, the main moving mechanism is high in control precision. This improves rotation precision of the folding apparatus 100, and helps improve use experience of the electronic device 1000.

For example, there are two first rotation shafts 41, and two second rotation shafts 42, and the two first rotation shafts 41 and the two second rotation shafts 42 are disposed in a one-to-one correspondence. In some other embodiments, there may also be one or three or more first rotation shafts 41, and one or three or more second rotation shafts 42. A quantity of first rotation shafts 41 may be equal to a quantity of second rotation shafts 42, and the first rotation shafts 41 and the second rotation shafts 42 are disposed in a one-to-one correspondence, or the first rotation shafts 41 and the second rotation shafts 42 are disposed in a staggered manner. A quantity of first rotation shafts 41 may alternatively be unequal to a quantity of second rotation shafts 42. Quantities, locations, and the like of the first rotation shaft 41 and the second rotation shaft 42 are not strictly limited in this embodiment of this application.

The first support 2 is provided with a rotation shaft hole 23 for inserting the first rotation shaft 41, the second support 3 is provided with a rotation shaft hole 33 for inserting the second rotation shaft 42, and the middle housing 1 is provided with a rotation shaft hole 141 for inserting the first rotation shaft 41 and a rotation shaft hole 151 for inserting the second rotation shaft 42. Specific settings (for example, quantities, locations, shapes, and sizes) of the rotation shaft hole 23 of the first support 2, the rotation shaft holes 33 of the second support 3, and the rotation shaft holes (141 and 151) of the middle housing 1 adapt to insertion requirements of the first rotation shaft 41 and the second rotation shaft 42.

It may be understood that, in some other embodiments, the first support 2 may alternatively be rotatably connected to the middle housing 1 by using a virtual shaft, and the second support 3 may alternatively be rotatably connected to the middle housing 1 by using a virtual shaft. For example, the first support 2 may be provided with an arc-shaped arm, the middle housing 1 may be provided with an arc-shaped groove, and the arc-shaped arm is disposed in the arc-shaped groove. The first support 2 is rotatably connected to the middle housing 1 by using a virtual shaft through relative movement of the arc-shaped groove and the arc-shaped arm. The second support 3 may be provided with an arc-shaped arm, the middle housing 1 may be provided with an arc-shaped groove, and the arc-shaped arm is disposed in the arc-shaped groove. The second support 3 is rotatably connected to the middle housing 1 by using a virtual shaft through relative movement of the arc-shaped groove and the arc-shaped arm.

Figure 9:
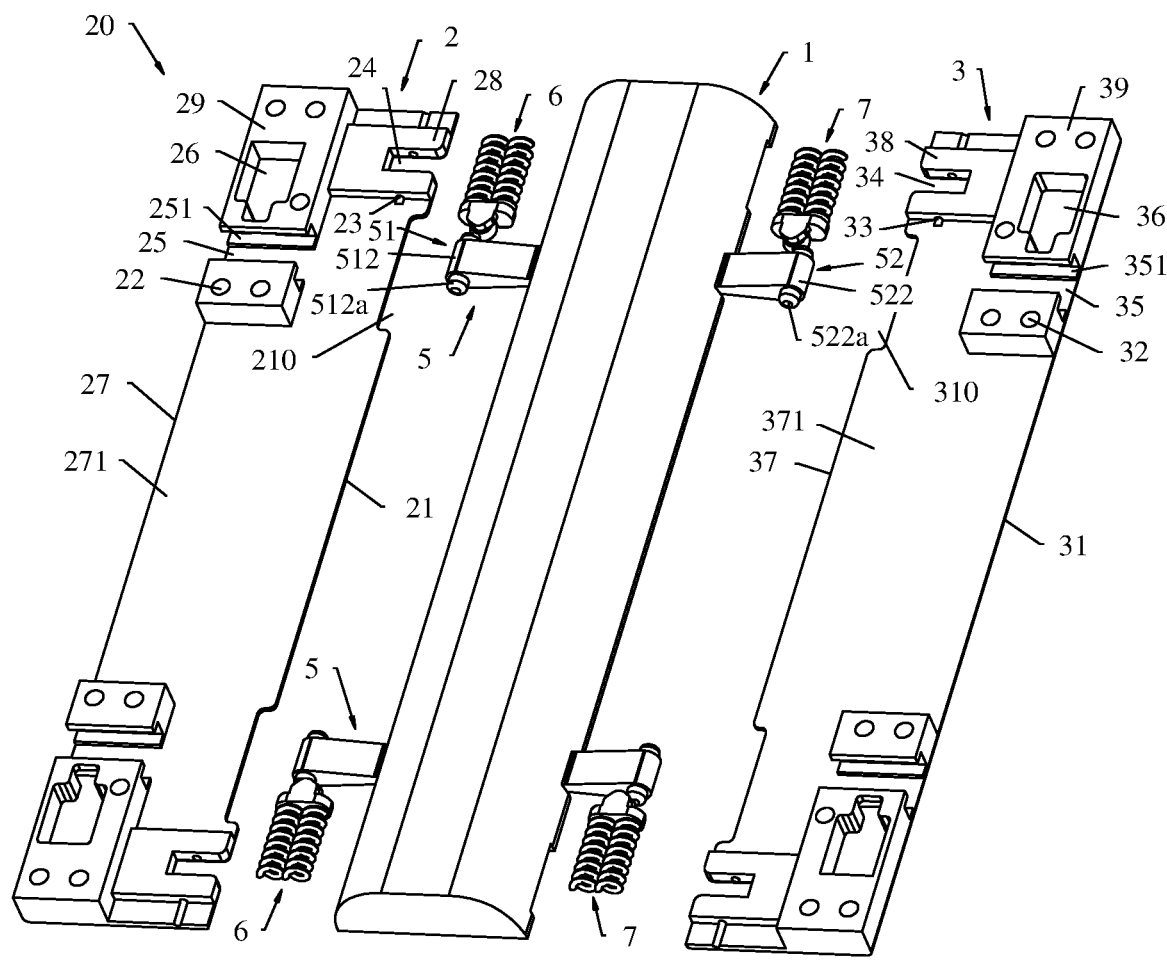
FIG. 9 is a schematic diagram of a structure of the rotation mechanism shown in FIG. 7 from another angle.

Refer to FIG. 7 to FIG. 9 together. FIG. 9 is a schematic diagram of a structure of the rotation mechanism 20 shown in FIG. 7 from another angle. An angle of view of the rotation mechanism 20 shown in FIG. 9 is reversed relative to an angle of view of the rotation mechanism 20 shown in FIG. 7.

In some embodiments, the rotation mechanism 20 further includes a synchronization assembly 5. The synchronization assembly 5 is mounted on the middle housing 1, and two ends of the synchronization assembly 5 are respectively configured to connect the first support 2 and the second support 3. The synchronization assembly 5 is configured to enable the first support 2 and the second support 3 to rotate synchronously in a movement process of the folding apparatus 100. In this case, mechanism operation experience of the folding apparatus 100 and the electronic device 1000 is relatively good.

For example, there are two synchronization assemblies 5. In some other embodiments, there may alternatively be one or three or more synchronization assemblies 5. A quantity and locations of the synchronization assemblies 5 are not strictly limited in this embodiment of this application.

In some embodiments, the rotation mechanism 20 further includes a plurality of damping members. The plurality of damping members may include a first damping member 6 mounted on the first support 2 and a second damping member 7 mounted on the second support 3. The plurality of damping members are configured to limit the synchronization assembly 5 when the folding apparatus 100 is in an open state, to limit the first support 2 and the second support 3. In this way, the folding apparatus 100 remains in the open state when no relatively large external force is applied, thereby improving use experience of a user. In addition, cooperation between the plurality of damping members and the synchronization assembly 5 can also provide resistance in a process in which the electronic device 1000 is unfolded to the open state and folded to the closed state, so that the user can experience a better sense of mechanism operation.

For example, the rotation mechanism 20 includes two groups of damping members, and the two groups of damping members respectively correspond to the two groups of synchronization assemblies 5. Each group of damping members includes a first damping member 6 and a second damping member 7, the first damping member 6 abuts against or clamps a part connected to the first support 2 in the synchronization assembly 5, and the second damping member 7 abuts against or clamps a part connected to the second support 3 in the synchronization assembly 5, to implement limiting. In some other embodiments, the rotation mechanism 20 may alternatively include one or three or more groups of damping members, and each group of damping members may alternatively include one or three or more damping members. A quantity of damping members and a correspondence between a damping member and the synchronization assembly 5 are not strictly limited in this embodiment of this application.

In some other embodiments, the damping member may alternatively be mounted on the middle housing 1, to limit the first support 2 and the second support 3 by limiting a part that is of the synchronization assembly 5 and that is mounted on the middle housing 1. In some other embodiments, alternatively, some damping members may be mounted on the middle housing 1, some damping members may be mounted on the first support 2, and some damping members may be mounted on the second support 3, to limit a plurality of parts of the synchronization assembly 5, thereby improving limiting reliability of the first support 2 and the second support 3. It may be understood that a limiting manner, a structure, and the like of the damping member mounted on the middle housing 1 may be different from those of the damping members mounted on the first support 2 and the second support 3. This is not strictly limited in this application.

Figure 10:
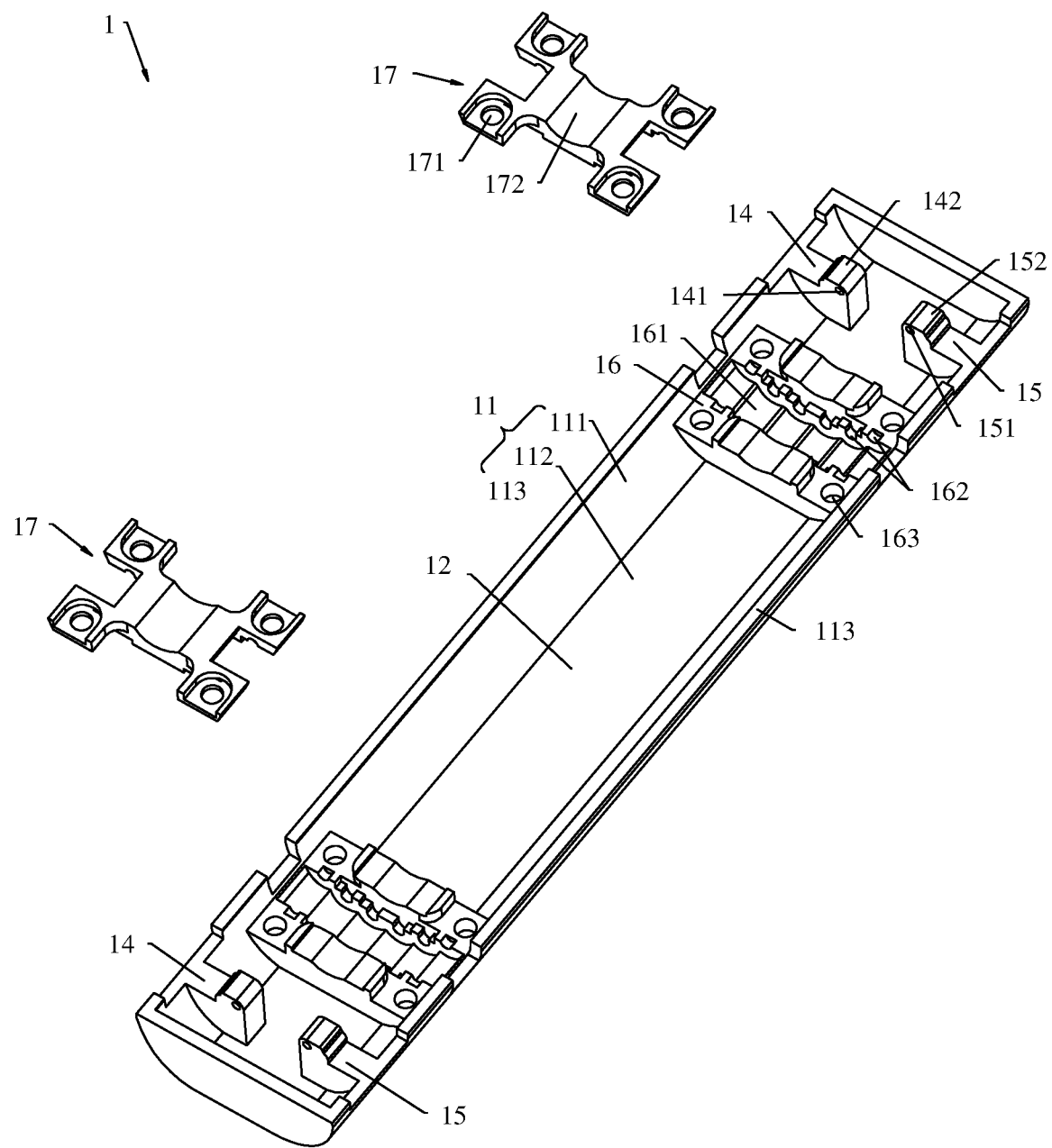
FIG. 10 is a schematic exploded view of a structure of the middle housing shown in FIG. 8.
Figure 11:
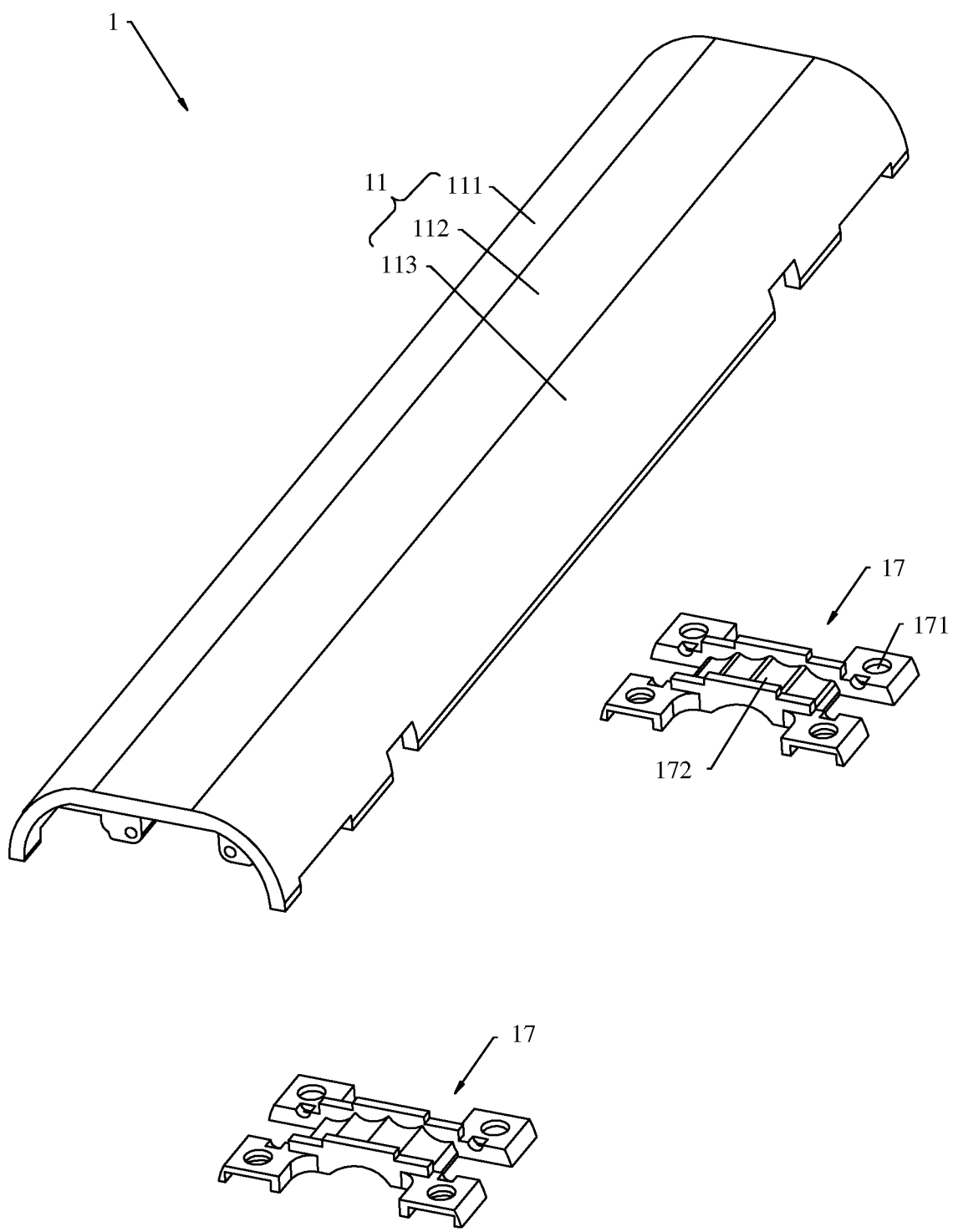
FIG. 11 is a schematic diagram of a structure of the middle housing shown in FIG. 10 from another angle.

Refer to FIG. 10 and FIG. 11 together. FIG. 10 is a schematic exploded view of a structure of the middle housing 1 shown in FIG. 8. FIG. 11 is a schematic diagram of a structure of the middle housing 1 shown in FIG. 10 from another angle. An angle of view of the middle housing 1 shown in FIG. 11 is reversed relative to an angle of view of the middle housing 1 shown in FIG. 10.

In some embodiments, the outer cover 11 includes a first curved part 111, a straight part 112, and a second curved part 113. Both the first curved part 111 and the second curved part 113 are arc-shaped, and are separately connected to two sides of the straight part 112. In other words, the first curved part 111, the straight part 112, and the second curved part 113 are sequentially connected, and the first curved part 111 and the second curved part 113 bend toward a same side of the straight part 112.

In this embodiment, the outer cover 11 forms a shape similar to an arc, which helps improve appearance experience and holding experience of the electronic device 1000 when the electronic device 1000 is in a closed state. In addition, a middle part of the outer cover 11 is the straight part 112, so that a thickness (a size in a direction perpendicular to the straight part 112) of the outer cover 11 is relatively small, and an overall thickness of the folding apparatus 100 when the folding apparatus 100 is in an open state is relatively small. This facilitates lightness and thinness of the electronic device 1000.

In some other embodiments, the outer cover 11 may alternatively be arc-shaped. In some other embodiments, the outer cover 11 may alternatively be in a semicircle shape, a semi-ellipse shape, or another shape.

In some embodiments, as shown in FIG. 10, the middle housing 1 further includes a first protrusion 14 and a second protrusion 15, and both the first protrusion 14 and the second protrusion 15 are located in the inner space 12 of the middle housing 1 and are fastened to the outer cover 11. For example, the first protrusion 14 and the second protrusion 15 are spaced from each other, the first protrusion 14 is disposed close to the first curved part 111, and the second protrusion 15 is disposed close to the second curved part 113. The first protrusion 14 may connect the first curved part 111 and the straight part 112 of the outer cover 11, and the second protrusion 15 may connect the second curved part 113 and the straight part 112 of the outer cover 11, to improve structural strength of the outer cover 11. In some other embodiments, the first protrusion 14 and the second protrusion 15 may alternatively be connected as an integrated structure. In this case, the first protrusion 14 and the second protrusion 15 may connect the first curved part 111, the straight part 112, and the second curved part 113 of the outer cover 11, to improve structural strength of the outer cover 11.

The rotation shaft hole 141 is formed on the first protrusion 14, and the rotation shaft hole 151 is formed on the second protrusion 15. With reference to FIG. 7, the first rotation shaft 41 is inserted into the rotation shaft hole 141 of the first protrusion 14 and the rotation shaft hole 23 of the first support 2, so that the first support 2 is rotatably connected to the first protrusion 14. The second rotation shaft 42 is inserted into the rotation shaft hole 151 of the second protrusion 15 and the rotation shaft hole 33 of the second support 3, so that the second support 3 is rotatably connected to the second protrusion 15.

In some embodiments, as shown in FIG. 10, a top 142 of the first protrusion 14 is far away from the straight part 112 of the outer cover 11, and the rotation shaft hole 141 is disposed on the top 142 of the first protrusion 14. A top 152 of the second protrusion 15 is far away from the straight part 112 of the outer cover 11, and the rotation shaft hole 151 is disposed on the top 152 of the second protrusion 15. With reference to FIG. 7 and FIG. 10, the first support 2 has a first notch 24, and the first notch 24 communicates with the rotation shaft hole 23 of the first support 2. The top 142 of the first protrusion 14 may be disposed in the first notch 24 to be embedded into the first support 2. The first rotation shaft 41 is inserted into the top 142 of the first protrusion 14, and the first rotation shaft 41 is further inserted into the first support 2 through the rotation shaft hole 23 that communicates with the first notch 24. The second support 3 has a second notch 34, and the second notch 34 communicates with the rotation shaft hole 33 of the second support 3. The top 152 of the second protrusion 15 may be disposed in the second notch 34 to be embedded into the second support 3. The second rotation shaft 42 is inserted into the top 152 of the second protrusion 15, and the second rotation shaft 42 is further inserted into the second support 3 through the rotation shaft hole 33 that communicates with the second notch 34. For a schematic diagram after the first support 2, the second support 3, and the middle housing 1 are assembled, refer to FIG. 4.

In this embodiment, locations of the rotation shaft holes (141 and 151) of the middle housing 1, a location of the rotation shaft hole 23 of the first support 2, and a location of the rotation shaft hole 33 of the second support 3 are set, so that the middle housing 1 may be rotatably connected to the first support 2 by using the first rotation shaft 41, and the middle housing 1 may be rotatably connected to the second support 3 by using the second rotation shaft 42, that is, the middle housing 1 may be rotatably connected to the first support 2 and the second support 3 by using physical shafts, with a reliable connection relationship, and a precise and stable rotation action. In addition, an embedding relationship between the first protrusion 14 and the first support 2 may enable the first protrusion 14 and the first support 2 to limit each other in a direction parallel to a rotation center, thereby improving reliability of a rotatable connection structure. An embedding relationship between the second protrusion 15 and the second support 3 may also enable the second protrusion 15 and the second support 3 to limit each other in a direction parallel to the rotation center, thereby improving reliability of the rotatable connection structure.

For example, as shown in FIG. 10, one first protrusion 14 and one second protrusion 15 are one group of rotation shaft protrusions, one group of rotation shaft protrusions may be separately disposed at a top and a bottom of the middle housing 1, and the two groups of rotation shaft protrusions are rotatably connected to the first support 2 and the second support 3 by using rotation shafts, so that rotations of the first support 2 and the second support 3 relative to the middle housing 1 bear uniform force and are smooth.

In some embodiments, as shown in FIG. 10, the middle housing 1 further includes a third protrusion 16, and the third protrusion 16 is located in the inner space 12 of the middle housing 1 and is fastened to the outer cover 11. The third protrusion 16 may be provided with a mounting groove 161, and the mounting groove 161 is approximately arc-shaped. A middle part of the mounting groove 161 is further indented in a direction close to the straight part 112 of the outer cover 11 relative to two sides of the mounting groove 161. It may be understood that, when the mounting groove 161 is relatively deep, the mounting groove 161 may alternatively be partially formed on the straight part 112 of the outer cover 11. For example, the mounting groove 161 may include a plurality of groove parts that are sequentially connected, a bottom wall of each groove part is an arc surface, and a rotation groove 162 may be provided on a side wall of each groove part. The third protrusion 16 may be further provided with a fastening hole 163. There may be a plurality of fastening holes 163, and the fastening holes 163 are arranged on two sides of the mounting groove 161. The third protrusion 16 may connect the first curved part 111, the straight part 112, and the second curved part 113 of the outer cover 11, to improve structural strength of the outer cover 11.

In some embodiments, as shown in FIG. 10 and FIG. 11, the middle housing 1 further includes an inner cover 17, and the inner cover 17 is fastened to the third protrusion 16. For example, the inner cover 17 may be provided with a fastening hole 171. The fastening hole 171 of the inner cover 17 may communicate with the fastening hole 163 of the third protrusion 16 by using a fastener, so that the inner cover 17 is fastened to the third protrusion 16. A quantity of the inner covers 17 is the same as a quantity of the third protrusions 16. As shown in FIG. 11, the inner cover 17 has a protrusion part 172, and the protrusion part 172 is approximately arc-shaped. The protrusion part 172 includes a plurality of arc-shaped concave surfaces that are sequentially connected.

Figure 12:
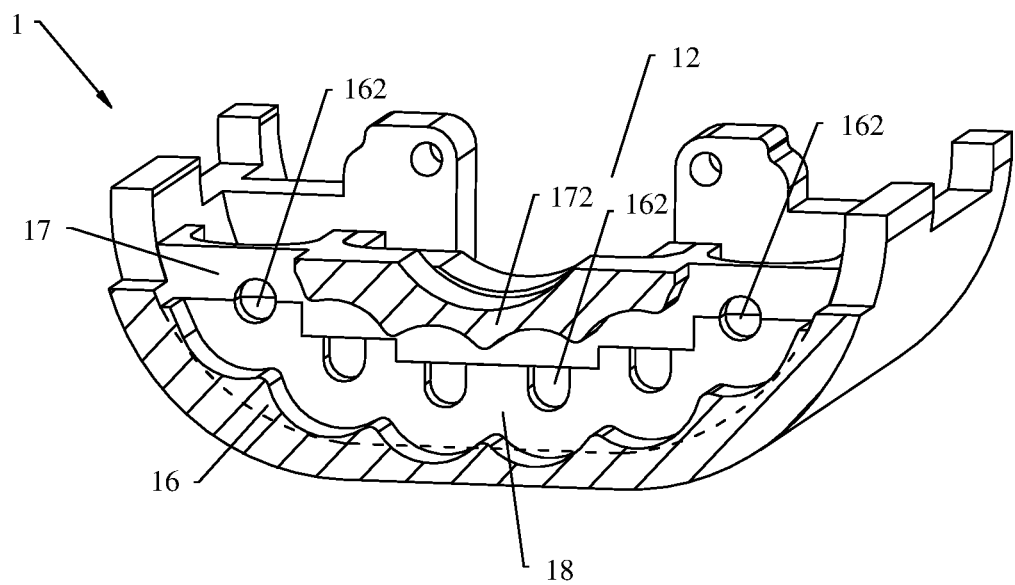
FIG. 12 is a sectional view of the middle housing shown in FIG. 8 cut along A-A.

FIG. 12 is a sectional view of the middle housing 1 shown in FIG. 8 cut along A-A. The inner cover 17 is fastened to the third protrusion 16, the protrusion part 172 of the inner cover 17 and the third protrusion 16 jointly form arc-shaped movement space 18, and the movement space 18 is used to mount the synchronization assembly 5. The movement space 18 is approximately arc-shaped.

Figure 13:
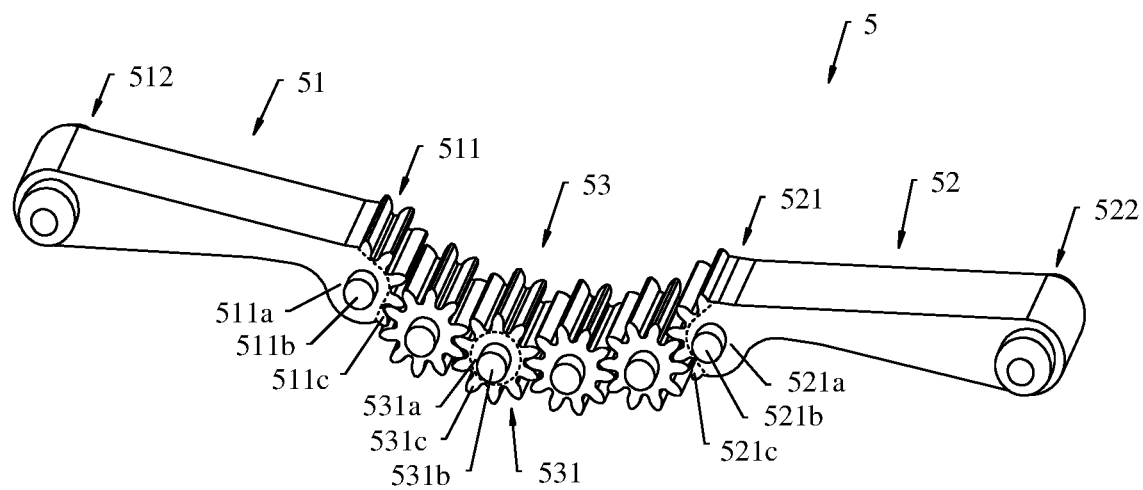
FIG. 13 is a schematic diagram of a structure of the synchronization assembly shown in FIG. 8.

FIG. 13 is a schematic diagram of a structure of the synchronization assembly 5 shown in FIG. 8.

In some embodiments, the synchronization assembly 5 of the rotation mechanism 20 includes a first synchronous swing arm 51, a second synchronous swing arm 52, and a gear group 53. The first synchronous swing arm 51 includes a rotation end 511 and a movable end 512, the second synchronous swing arm 52 includes a rotation end 521 and a movable end 522, and the rotation end 521 of the second synchronous swing arm 52 is engaged with the rotation end 511 of the first synchronous swing arm 51 by using the gear group 53.

For example, the rotation end 511 of the first synchronous swing arm 51 includes a rotation body 511a, a rotation shaft 511b, and a gear 511c. The rotation shaft 511b is fastened to a front surface and/or a back surface of the rotation body 511a, and the gear 511c is fastened to a circumferential side surface of the rotation body 511a. The rotation end 521 of the second synchronous swing arm 52 includes a rotation body 521a, a rotation shaft 521b, and a gear 521c. The rotation shaft 521b is fastened to a front surface and/or a back surface of the rotation body 521a, and the gear 521c is fastened to a circumferential side surface of the rotation body 521a.

The gear 511c at the rotation end 511 of the first synchronous swing arm 51 is engaged with the gear 521c at the rotation end 521 of the second synchronous swing arm 52 by using the gear group 53. The gear group 53 may include a plurality of gear shafts 531, and the plurality of gear shafts 531 are engaged with each other. The gear 511c at the rotation end 511 of the first synchronous swing arm 51 is engaged with an end gear shaft 531 close to the first synchronous swing arm 51 in the gear group 53, and the gear 521c at the rotation end 521 of the second synchronous swing arm 52 is engaged with an end gear shaft 531 close to the second synchronous swing arm 52 in the gear group 53. For example, each gear shaft 531 includes a body 531a, a rotation shaft 531b, and a gear 531c. The rotation shaft 531b is fastened on a front surface and/or a back surface of the body 531a, and the gear 531c is fastened on a circumferential side surface of the body 531a.

With reference to FIG. 12 and FIG. 13, the rotation end 511 of the first synchronous swing arm 51, the gear group 53, and the rotation end 521 of the second synchronous swing arm 52 may be disposed in the movement space 18 of the middle housing 1. The rotation end 511 of the first synchronous swing arm 51 is rotatably connected to the middle housing 1. The rotation shaft 511b of the rotation end 511 of the first synchronous swing arm 51 may extend into a part of the rotation groove 162 of the movement space 18. The rotation end 521 of the second synchronous swing arm 52 is rotatably connected to the middle housing 1. The rotation shaft 521b of the rotation end 521 of the second synchronous swing arm 52 may extend into another part of the rotation groove 162 of the movement space 18. A plurality of gear shafts 531 of the gear group 53 may be sequentially disposed in the movement space 18, and each gear shaft 531 is rotatably connected to the middle housing 1. The rotation shaft 531b of each gear shaft 531 may extend into another part of the rotation groove 162 of the movement space 18.

For example, the rotation end 511 of the first synchronous swing arm 51, the plurality of gear shafts 531, and the rotation end 521 of the second synchronous swing arm 52 are arranged in an arc shape. In this embodiment, some structures of the synchronization assembly 5 mounted on the middle housing 1 are arranged in the arc shape, so that bottom space of the inner space 12 of the middle housing 1 can be fully used, and top space of the inner space 12 of the middle housing 1 can be released to form screen accommodating space. When the electronic device 1000 is closed, the screen accommodating space is used to accommodate a part of the flexible display 200. In this way, compactness of component arrangement of the electronic device 1000 is improved, and a size of the electronic device 1000 is reduced.

It may be understood that a quantity, sizes, and the like of gear shafts 531 in the gear group 53 may be designed based on a specific model such as a product form and a size. This is not strictly limited in this application. The larger quantity of gear shafts 531, the smaller size of the gear shaft 531, so that more space is released. The smaller quantity of gear groups 53, the larger size of the gear shaft 531, and the smaller accumulated transmission error of the gear group 53, which helps improve movement accuracy.

Refer to FIG. 9 again. The synchronization assembly 5 is mounted on the middle housing 1, the movable end 512 of the first synchronous swing arm 51 is located on an outer side of the middle housing 1, and the movable end 522 of the second synchronous swing arm 52 is located on an outer side of the middle housing 1. The movable end 512 of the first synchronous swing arm 51 is movably connected to the first support 2. In a process in which the first housing 10 and the second housing 30 are folded or unfolded relative to each other, the movable end 512 of the first synchronous swing arm 51 slides and rotates relative to the first support 2. The movable end 522 of the second synchronous swing arm 52 is movably connected to the second support 3. In a process in which the first housing 10 and the second housing 30 are folded or unfolded relative to each other, the movable end 522 of the second synchronous swing arm 52 slides and rotates relative to the second support 3.

For example, the first support 2 is provided with a first sliding slot 25, and the movable end 512 of the first synchronous swing arm 51 is disposed in the first sliding slot 25. A middle part of a slot wall of the first sliding slot 25 is indented to form guide space 251 of the first sliding slot 25. The movable end 512 of the first synchronous swing arm 51 has a rotation shaft 512a, the rotation shaft 512a may be disposed in the guide space 251 of the first sliding slot 25, and the rotation shaft 512a may slide and rotate in the guide space 251 of the first sliding slot 25. Through cooperation between the guide space 251 of the first sliding slot 25 and the rotation shaft 512a of the movable end 512 of the first synchronous swing arm 51, the movable end 512 of the first synchronous swing arm 51 can be guided in a sliding direction of the first sliding slot 25, so that a relative sliding action between the movable end 512 of the first synchronous swing arm 51 and the first support 2 is easier to implement and higher in control precision.

The second support 3 is provided with a second sliding slot 35, and the movable end 522 of the second synchronous swing arm 52 is disposed in the second sliding slot 35. A middle part of a slot wall of the second sliding slot 35 is indented to form guide space 351 of the second sliding slot 35. The movable end 522 of the second synchronous swing arm 52 has a rotation shaft 522a, the rotation shaft 522a may be disposed in the guide space 351 of the second sliding slot 35, and the rotation shaft 522a may slide and rotate in the guide space 251 of the first sliding slot 25. Through cooperation between the guide space 351 of the second sliding slot 35 and the rotation shaft 522a of the movable end 522 of the second synchronous swing arm 52, the movable end 522 of the second synchronous swing arm 52 can be guided in a sliding direction of the second sliding slot 35, so that a relative sliding action between the movable end 522 of the second synchronous swing arm 52 and the first support 2 is easier to implement and higher in control precision.

In some embodiments, as shown in FIG. 9, the first support 2 is further provided with a first limiting slot 26, and the first limiting slot 26 communicates with the first sliding slot 25. The first damping member 6 may be disposed in the first limiting slot 26 and partially extends into the first sliding slot 25. When the first housing 10 and the second housing 30 are in an open state, the first damping member 6 abuts against the movable end 512 of the first synchronous swing arm 51. Specifically, the first limiting slot 26 communicates with the guide space 251 of the first sliding slot 25, and the first damping member 6 may abut against the rotation shaft 512a of the movable end 512 of the first synchronous swing arm 51.

The second support 3 is further provided with a second limiting slot 36, and the second limiting slot 36 communicates with the second sliding slot 35. The second damping member 7 may be disposed in the second limiting slot 36 and partially extends into the second sliding slot 35. When the first housing 10 and the second housing 30 are in the open state, the second damping member 7 abuts against the movable end 522 of the second synchronous swing arm 52. Specifically, the second limiting slot 36 communicates with the guide space 351 of the second sliding slot 35, and the second damping member 7 may abut against the rotation shaft 522a of the movable end 522 of the second synchronous swing arm 52.

Figure 14:
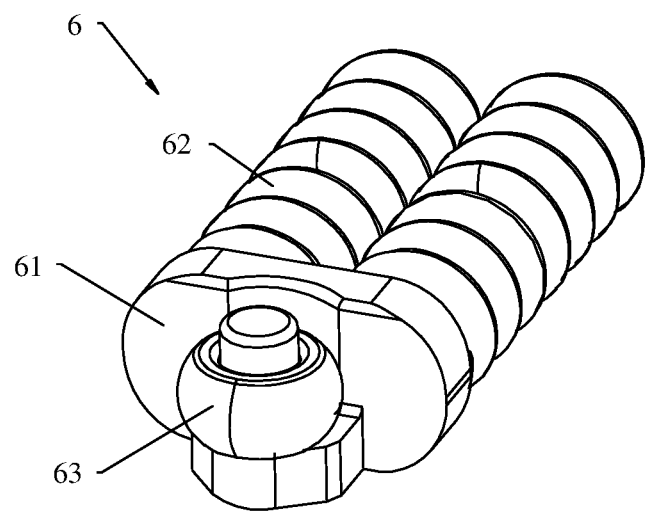
FIG. 14 is a schematic diagram of a structure of the first damping member shown in FIG. 9.
Figure 15:
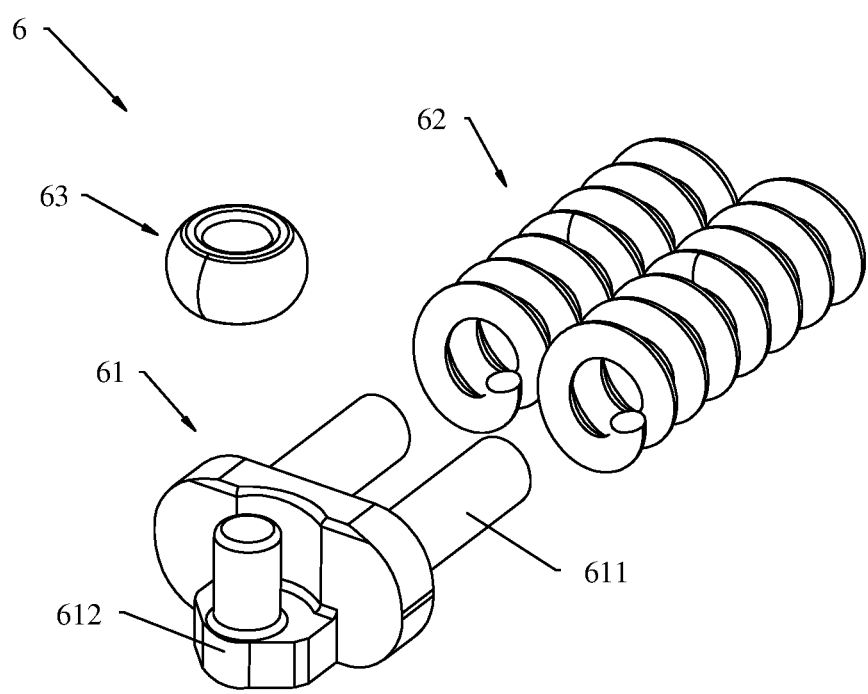
FIG. 15 is a schematic exploded diagram of a structure of the first damping member shown in FIG. 14.

Refer to FIG. 14 and FIG. 15 together. FIG. 14 is a schematic diagram of a structure of the first damping member 6 shown in FIG. 9. FIG. 15 is a schematic exploded diagram of a structure of the first damping member 6 shown in FIG. 14.

In some embodiments, the first damping member 6 may be an elastic damping member. The first damping member 6 includes a holder 61 and an elastic member 62. The holder 61 is of a rigid structure, and is not prone to deformation under an external force. The elastic member 62 is of an elastic structure, and is prone to deformation under an external force. The holder 61 includes a control part 611 and an abutting part 612. One end of the elastic member 62 is mounted on the control part 611 of the holder 61, and the other end abuts against a slot wall of the first limiting slot 26. In this case, the abutting part 612 of the holder 61 may abut against a slot wall on the other side of the first limiting slot 26 under elastic force of the elastic member 62. When the first housing 10 and the second housing 30 are in an open state, the abutting part 612 of the holder 61 is clamped to the movable end 512 of the first synchronous swing arm 51.

In this embodiment, the elastic member 62 of the first damping member 6 can deform under an external force, so that the first damping member 6 can smoothly move between two sides of a rotation shaft of the movable end 512 relative to the movable end 512 of the first synchronous swing arm 51, thereby improving limiting reliability between the first damping member 6 and the movable end 512 of the first synchronous swing arm 51.

The first damping member 6 may further include a buffer 63, and the buffer 63 is mounted on the abutting part 612 of the holder 61. The buffer 63 may be made of a material (for example, rubber) with small stiffness, so that when being subjected to an external force, the buffer 63 can absorb an impact force through deformation, thereby implementing buffering. Because the buffer 63 is sleeved on the abutting part 612 of the holder 61, the first damping member 6 abuts against the movable end 512 of the first synchronous swing arm 51 by using the first buffer 63 having a buffer function. This helps reduce a risk of wear of the holder 61 of the first damping member 6 and the movable end 512 of the first synchronous swing arm 51 in a long-time relative movement process, and improve limiting reliability of the first damping member 6, so that reliability of the rotation mechanism 20 is improved.

A structure of the second damping member 7 may be the same as a structure of the first damping member 6, to simplify material types of the folding apparatus 100 and reduce costs. The structure of the second damping member 7 is not described in detail in this embodiment of this application.

It may be understood that, in the foregoing embodiment, a structure of a damping member is shown by using an example. The damping member in this embodiment of this application may also have another structure, for example, an elastic rubber block is used. The damping member in the foregoing embodiment limits the synchronization assembly 5 when the folding apparatus 100 is in an open state. In some other embodiments, the folding apparatus 100 may alternatively include a damping member that limits the synchronization assembly 5 in a closed state. For a limiting manner and a damping member structure, refer to the foregoing embodiment.

Refer to FIG. 9 again. In some embodiments, the first support 2 includes a first support plate 27, a first bump 28, and a second bump 29. The support surface 21 of the first support 2 is formed on the first support plate 27. The first support plate 27 further includes a fastening surface 271, and the fastening surface 271 of the first support plate 27 is disposed opposite to the support surface 21. Both the first bump 28 and the second bump 29 are fastened to the fastening surface 271 of the first support plate 27. A height of the first bump 28 is less than a height of the second bump 29. The rotation shaft hole 23 of the first support 2 may be formed on the first support plate 27 or formed on the first bump 28. Disposing the first bump 28 can not only reduce arrangement difficulty of the rotation shaft hole 23, but also avoid insufficient structural strength of a part that is of the first support 2 and that is located around the rotation shaft hole 23. The first sliding slot 25 and the first limiting slot 26 of the first support 2 may be formed on the second bump 29. The fastening hole 22 of the first support 2 may also be formed on the second bump 29.

The second support 3 includes a second support plate 37, a third bump 38, and a fourth bump 39. The support surface 31 of the second support 3 is formed on the second support plate 37. The second support plate 37 further includes a fastening surface 371, and the fastening surface 371 of the second support plate 37 is disposed opposite to the support surface 31. Both the third bump 38 and the fourth bump 39 are fastened to the fastening surface 371 of the second support plate 37. The rotation shaft hole 33 of the second support 3 may be formed on the second support plate 37 or formed on the third bump 38. Disposing the third bump 38 can not only reduce arrangement difficulty of the rotation shaft hole 33, but also avoid insufficient structural strength of a part that is of the second support 3 and that is located around the rotation shaft hole 33. The second sliding slot 35 and the second limiting slot 36 of the second support 3 may be formed on the fourth bump 39. The fastening hole 32 of the second support 3 may also be formed on the fourth bump 39.

It may be understood that the first support 2 and the second support 3 use the support plate as a base, and corresponding bumps are disposed at locations at which a connection structure needs to be disposed, to implement structure arrangement. This can simplify structures of the first support 2 and the second support 3, and reduce an overall weight.

The first notch 24 of the first support 2 penetrates through the first bump 28 and the first support plate 27. The first support 2 may be further provided with a third notch 210, the third notch 210 is formed on the first support plate 27, and the third notch 210 is configured to avoid the first synchronous swing arm 51 of the synchronization assembly 5. The second notch 34 of the second support 3 penetrates the third bump 38 and the second support plate 37. The second support 3 may be further provided with a fourth notch 310, the fourth notch 310 is formed on the second support plate 37, and the fourth notch 310 is configured to avoid the second synchronous swing arm 52 of the synchronization assembly 5.

The first support 2 may be an integrally formed mechanical part, and the second support 3 may be an integrally formed mechanical part. In this embodiment, because both the first support 2 and the second support 3 are integrally formed mechanical parts, a quantity of parts of the rotation mechanism 20 is reduced, and movement reliability of the rotation mechanism 20 is improved. In some other embodiments, the first support 2 may alternatively be assembled by using a plurality of components to form an integrated structure, and the second support 3 may alternatively be assembled by using a plurality of components to form an integrated structure. Specific structures, processing manners, and the like of the first support 2 and the second support 3 are not strictly limited in this application.

The following mainly describes a structure of the electronic device 1000 with reference to a plurality of sectional views of the electronic device 1000.

Figure 16:
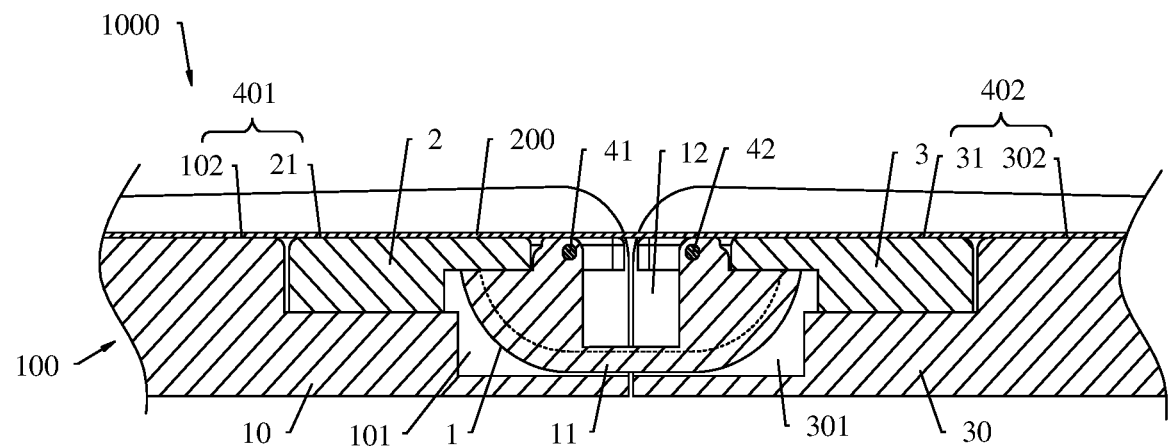
FIG. 16 is a sectional view of a section of the electronic device shown in FIG. 1 along B-B.
Figure 17:
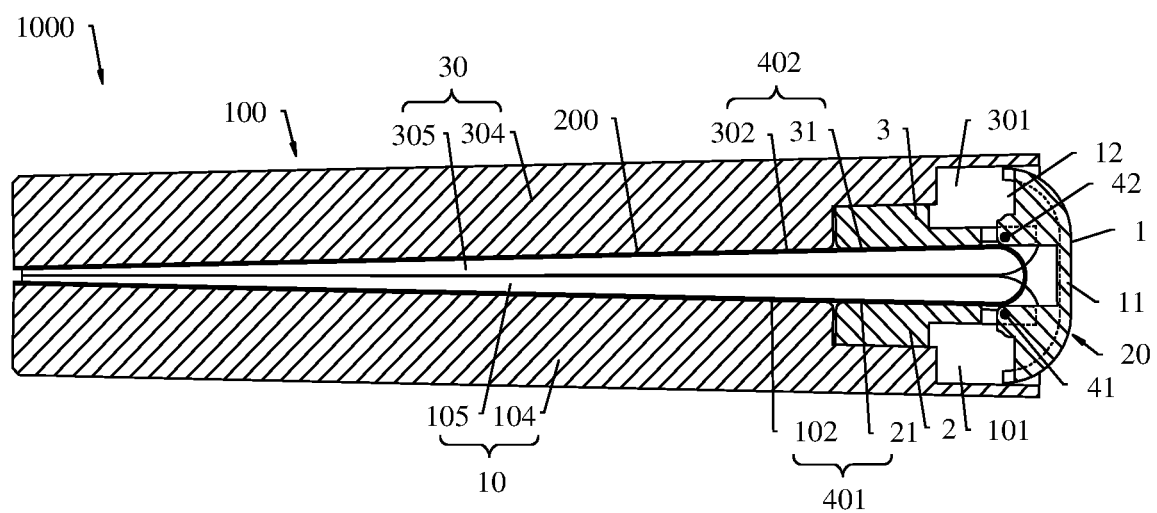
FIG. 17 is a sectional view of the electronic device shown in FIG. 3 cut along C-C.

Refer to FIG. 16 and FIG. 17 together. FIG. 16 is a sectional view of a section of the electronic device 1000 shown in FIG. 1 along B-B. FIG. 17 is a sectional view of the electronic device 1000 shown in FIG. 3 cut along C-C. In other words, the electronic device 1000 shown in FIG. 16 is in an open state, and the electronic device 1000 shown in FIG. 17 is in a folded state.

One end of the first support 2 is rotatably connected to the middle housing 1 by using the first rotation shaft 41, and the other end of the first support 2 is fixedly mounted to the first mounting groove 101 of the first housing 10. That is, one end of the first support 2 is rotatably connected to the middle housing 1, and the other end is fixedly connected to the first housing 10. The support surface 21 of the first support 2 is spliced with the support surface 102 of the first housing 10 to form the first support surface 401. One end of the second support 3 is rotatably connected to the middle housing 1 by using the second rotation shaft 42, and the other end of the second support 3 is fixedly mounted to the second mounting groove 301 of the second housing 30. That is, one end of the second support 3 is rotatably connected to the middle housing 1, and the other end is fixedly connected to the second housing 30. The support surface 31 of the second support 3 is spliced with the support surface 302 of the second housing 30 to form the second support surface 402.

As shown in FIG. 16, when the first housing 10 and the second housing 30 are unfolded relative to each other to an open state, the first support 2 and the second support 3 are close to each other, and the first support surface 401 is flush with the second support surface 402. The first support surface 401 and the second support surface 402 jointly support the flexible display 200, and the flexible display 200 is in a flat form.

As shown in FIG. 17, when the first housing 10 and the second housing 30 are folded relative to each other to a closed state, the first support 2 and the second support 3 are far away from each other, and the first support surface 401 and the second support surface 402 gradually approach each other in a direction away from the middle housing 1. The first support surface 401 supports a part of the flexible display 200, the second support surface 402 supports a part of the flexible display 200, the part of the flexible display 200 is bent and detached from the first support surface 401 and the second support surface 402, and a cross-sectional shape of the flexible display 200 is similar to a baseball shape.

In this embodiment, the electronic device 1000 uses the folding apparatus 100 to implement screen inward folding, and the electronic device 1000 may be bent. A main moving mechanism of the rotation mechanism 20 of the folding apparatus 100 is a single-stage physical shaft rotation mechanism among the first support 2, the second support 3 and the middle housing 1. Because of a small quantity of parts, a simple part fitting relationship, a degree of freedom of 1, a short size chain, and a small accumulated error, the main moving mechanism of the rotation mechanism 20 is high in control precision. This improves rotation precision of the folding apparatus 100, and helps improve use experience of the electronic device 1000.

As shown in FIG. 16, when the first housing 10 and the second housing 30 are in an open state, the first support 2 covers a part of the inner space 12 of the middle housing 1, and the second support 3 covers a part of the inner space 12 of the middle housing 1. In this case, the first support 2 and the second support 3 are close to each other, a distance between the support surface 21 of the first support 2 and the support surface 31 of the second support 3 is relatively small, and the rotation mechanism 20 can provide relatively complete planar support for the bending part 200b of the flexible display 200 in the open state by using a two-plate structure. For example, when the folding apparatus 100 is in an open state, the first support 2 and the second support 3 are spliced, to better provide strong support for the flexible display 200.

As shown in FIG. 17, when the first housing 10 and the second housing 30 are in a closed state, the first support 2 partially extends into the inner space 12 of the middle housing 1, and the second support 3 partially extends into the inner space 12 of the middle housing 1. In this embodiment, when the folding apparatus 100 is in a closed state, the first support 2 and the second support 3 partially extend into the inner space 12 of the middle housing 1, a part of space that is located between the first support 2 and the second support 3 and that is in the inner space 12 of the middle housing 1 is released to form screen accommodating space, and the flexible display 200 may partially extend into the inner space 12 of the middle housing 1, thereby improving space utilization. In this way, components of the electronic device 1000 arranged more compactly, thereby facilitating miniaturization of the electronic device woo.

As shown in FIG. 16, when the first housing 10 and the second housing 30 are in the open state, the first support 2 abuts against one side edge of the outer cover 11 of the middle housing 1, and the second support 3 abuts against the other side edge of the outer cover 11. The outer cover 11 can stop the first support 2 and the second support 3 when the folding apparatus 100 is in the open state, to prevent the folding apparatus 100 from being over-folded during unfolding. In this way, force applied to the flexible display 200 is reduced and reliability of the flexible display 200 and the electronic device 1000 is improved.

As shown in FIG. 16, when the first housing 10 and the second housing 30 are in the open state, the middle housing 1 is located in the first mounting groove 101 and the second mounting groove 301, and the first housing 10 and the second housing 30 cover the outer cover 11. As shown in FIG. 17, when the first housing 10 and the second housing 30 are in the closed state, the middle housing 1 partially extends out of the first mounting groove 101 and the second mounting groove 301, and the outer cover 11 is exposed relative to the first housing 10 and the second housing 30. In this embodiment, in a process of switching between the open state and the closed state of the folding apparatus 100, the middle housing 1 is gradually exposed or hidden relative to the first housing 10 and the second housing 30, and the three cooperate with each other to implement back-side self-shielding of the folding apparatus 100 and the electronic device 1000. This improves appearance integrity and waterproof and dustproof performance.

As shown in FIG. 17, when the first housing 10 and the second housing 30 are in the closed state, the first baffle plate 105 of the first housing 10 is spliced with the second baffle plate 305 of the second housing 30, to jointly shield a gap between the first body 104 of the first housing 10 and the second body 304 of the second housing 30. In this case, the folding apparatus 100 and the electronic device 1000 implement appearance self-shielding.

Figure 18:
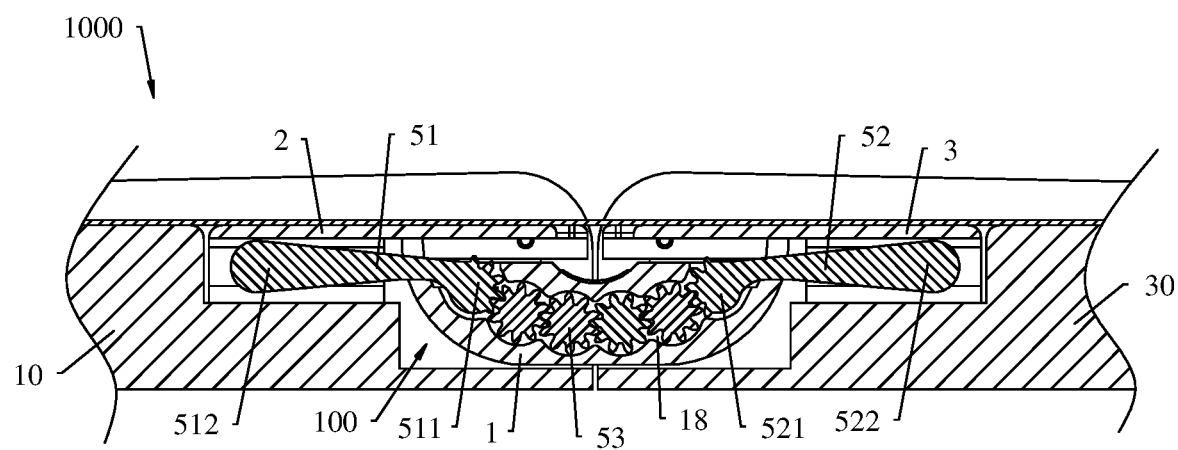
FIG. 18 is a sectional view of a section of the electronic device shown in FIG. 1 along D-D.
Figure 19:
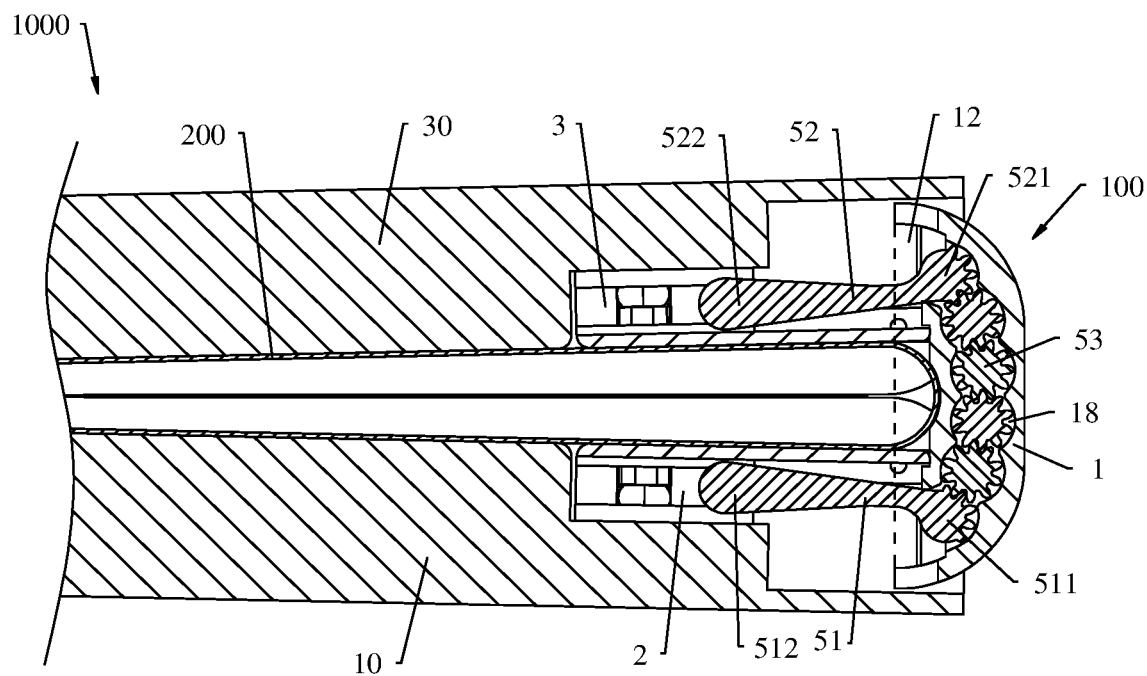
FIG. 19 is a sectional view of the electronic device shown in FIG. 3 cut along E-E.

Refer to FIG. 18 and FIG. 19 together. FIG. 18 is a sectional view of a section of the electronic device 1000 shown in FIG. 1 along D-D. FIG. 19 is a sectional view of the electronic device 1000 shown in FIG. 3 cut along E-E.

The rotation end 511 of the first synchronous swing arm 51, the gear group 53, and the rotation end 521 of the second synchronous swing arm 52 are disposed in the movement space 18 of the middle housing 1. The rotation end 511 of the first synchronous swing arm 51 is rotatably connected to the middle housing 1, and the movable end 512 of the first synchronous swing arm 51 is movably connected to the first support 2. In a process in which the first housing 10 and the second housing 30 are folded or unfolded relative to each other, the movable end 512 of the first synchronous swing arm 51 slides and rotates relative to the first support 2. The rotation end 521 of the second synchronous swing arm 52 is rotatably connected to the middle housing 1, and the movable end 522 of the second synchronous swing arm 52 is movably connected to the second support 3. In a process in which the first housing 10 and the second housing 30 are folded or unfolded relative to each other, the movable end 522 of the second synchronous swing arm 52 slides and rotates relative to the second support 3. The rotation end 521 of the second synchronous swing arm 52 is engaged with the rotation end 511 of the first synchronous swing arm 51 by using the gear group 53.

In this embodiment, in a process of unfolding and folding the folding apparatus 100, sliding and rotation actions of the first synchronous swing arm 51 relative to the first support 2 are symmetrical to sliding and rotation actions of the second synchronous swing arm 52 relative to the second support 3, so that rotation actions of the first support 2 and the second support 3 relative to the middle housing 1 are synchronous, that is, the first support 2 and the second support 3 are synchronously close to or away from each other. Therefore, rotation actions of the first housing 10 and the second housing 30 relative to the middle housing 1 are good in synchronization, thereby improving mechanism operation experience of the folding apparatus 100 and the electronic device 1000.

As shown in FIG. 18, because the rotation end 511 of the first synchronous swing arm 51, the gear group 53, and the rotation end 521 of the second synchronous swing arm 52 are arranged in an arc shape, bottom space of the inner space 12 of the middle housing 1 is fully utilized, so that top space of the inner space 12 of the middle housing 1 is released to form screen accommodating space. When the flexible display 200 is in a closed state, a part of the flexible display 200 can be accommodated in the inner space of the middle housing 1. This helps improve compactness of component arrangement of the electronic device 1000, and reduce a size of the electronic device 1000.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

What is claimed is:

1. An electronic device, comprising:
a first housing;
a rotation mechanism and a second housing that are sequentially connected; and
a flexible display;
wherein the rotation mechanism is deformable such that the first housing and the second housing are folded or unfolded relative to each other;
wherein the rotation mechanism comprises a middle housing, a first support and a second support, a first end of the first support is rotatably connected to the middle housing, and a second end of the first support is fixedly connected to the first housing, a support surface of the first support is spliced with a support surface of the first housing to form a first support surface, a first end of the second support is rotatably connected to the middle housing, and a second end of the second support is fixedly connected to the second housing, and a support surface of the second support is spliced with a support surface of the second housing to form a second support surface;
wherein the rotation mechanism is configured in a manner that, when the first housing and the second housing are unfolded relative to each other to an open state, the first support and the second support are closest to each other, and the first support surface is flush with the second support surface; and when the first housing and the second housing are folded relative to each other to a closed state, the first support and the second support are farthest away from each other, and during folding of the first housing and the second housing, the first support surface and the second support surface approach each other in a direction away from the middle housing;
wherein the flexible display comprises a first part, a second part and a third part that are sequentially arranged, and the first part is fixedly connected to the support surface of the first housing, the third part is fixedly connected to the support surface of the second housing, and the second part deforms during folding or unfolding of the first housing and the second housing relative to each other;
wherein the middle housing comprises an outer cover, and the outer cover defines an inner space of the middle housing;
wherein the middle housing further comprises a first protrusion and a second protrusion, and both the first protrusion and the second protrusion are located in the inner space of the middle housing and are fastened to the outer cover; and
wherein the rotation mechanism further comprises a first rotation shaft and a second rotation shaft, wherein the first rotation shaft is inserted into the first support and the first protrusion such that the first support is rotatably connected to the first protrusion, and the second rotation shaft is inserted into the second support and the second protrusion such that the second support is rotatably connected to the second protrusion.

2. The electronic device according to claim 1, wherein the first part is further fixedly connected to a partial region of the support surface of the first support, and the second part is further fixedly connected to a partial region of the support surface of the second support.

3. The electronic device according to claim 1, wherein the rotation mechanism is further configured in a manner that:
when the first housing and the second housing are in the open state, the first support covers a part of the inner space of the middle housing, and the second support covers another part of the inner space of the middle housing; and
when the first housing and the second housing are in the closed state, the first support partially extends into the inner space of the middle housing, and the second support partially extends into the inner space of the middle housing.

4. The electronic device according to claim 1, wherein the rotation mechanism is configured in a manner that, when the first housing and the second housing are in the open state, the support surface of the first support is spliced with the support surface of the second support to form a support surface of a bending region.

5. The electronic device according to claim 1, wherein a first mounting groove extends in a side that is of the first housing and that is closest to the rotation mechanism, the first support is mounted in the first mounting groove, a second mounting groove extends in a side that is of the second housing and that is closest to the rotation mechanism, and the second support is mounted in the second mounting groove; and
wherein the rotation mechanism is further configured in a manner that:
when the first housing and the second housing are in the open state, the middle housing is located in the first mounting groove and the second mounting groove, and the first housing and the second housing cover the outer cover of the middle housing; and
when the first housing and the second housing are in the closed state, the middle housing partially extends out of the first mounting groove and the second mounting groove, and the outer cover is exposed relative to the first housing and the second housing.

6. The electronic device according to claim 1, wherein the rotation mechanism further comprises a first synchronous swing arm, a second synchronous swing arm, and a gear group;
the first synchronous swing arm comprises a rotation end and a movable end, the rotation end of the first synchronous swing arm is rotatably connected to the middle housing, the movable end of the first synchronous swing arm is movably connected to the first support, and when the first housing and the second housing are folded or unfolded relative to each other, the movable end of the first synchronous swing arm slides relative to the first support;
the second synchronous swing arm comprises a rotation end and a movable end, the rotation end of the second synchronous swing arm is rotatably connected to the middle housing, the movable end of the second synchronous swing arm is movably connected to the second support, and when the first housing and the second housing are folded or unfolded relative to each other, the movable end of the second synchronous swing arm slides relative to the second support; and the rotation end of the second synchronous swing arm is engaged with the rotation end of the first synchronous swing arm using the gear group.

7. The electronic device according to claim 6, wherein the gear group comprises a plurality of gear shafts, the plurality of gear shafts are engaged with one another, each gear shaft is rotatably connected to the middle housing, and the rotation end of the first synchronous swing arm, the plurality of gear shafts, and the rotation end of the second synchronous swing arm are arranged in an arc shape.

8. The electronic device according to claim 6, wherein a first sliding slot and a first limiting slot extend in the first support, the first limiting slot is in communication with the first sliding slot, the movable end of the first synchronous swing arm is disposed in the first sliding slot, the rotation mechanism further comprises a first damping member, and the first damping member is disposed in the first limiting slot and partially extends into the first sliding slot; and
wherein the rotation mechanism is further configured in a manner that, when the rotation mechanism is in the open state, the first damping member abuts against the movable end of the first synchronous swing arm.

9. A rotation mechanism, comprising:
a middle housing, comprising an outer cover, a first protrusion, and a second protrusion, wherein the outer cover defines an inner space of the middle housing, and both the first protrusion and the second protrusion are located in the inner space of the middle housing and are fastened to the outer cover;
a first support; and
a second support, wherein a first end of the first support is rotatably connected to the middle housing, and a first end of the second support is rotatably connected to the middle housing; and
wherein the rotation mechanism is configured in a manner that:
when the first support and the second support of the rotation mechanism are unfolded relative to each other to an open state, the first support and the second support are closest to each other, and a support surface of the first support is flush with a support surface of the second support; and
when the first support and the second support of the rotation mechanism are folded relative to each other to a closed state, the first support and the second support are farthest away from each other, and during folding of the first support and the second support, the first support and the second support approach each other in a direction away from the middle housing; and
wherein the rotation mechanism further comprises a first rotation shaft and a second rotation shaft, wherein the first rotation shaft is inserted into the first support and the first protrusion such that the first support is rotatably connected to the first protrusion, and the second rotation shaft is inserted into the second support and the second protrusion such that the second support is rotatably connected to the second protrusion.

10. The rotation mechanism according to claim 9, wherein the rotation mechanism is further configured in a manner that:
when the rotation mechanism is in the open state, the first support covers a part of the inner space of the middle housing, and the second support covers another part of the inner space of the middle housing; and
when the rotation mechanism is in the closed state, the first support partially extends into the inner space of the middle housing, and the second support partially extends into the inner space of the middle housing.

11. The rotation mechanism according to claim 10, wherein the rotation mechanism is further configured in a manner that when the rotation mechanism is in the open state, the support surface of the first support is spliced with the support surface of the second support to form a support surface of a bending region.

12. The rotation mechanism according to claim 11, wherein the outer cover comprises a first curved part, a straight part, and a second curved part, and the first curved part and the second curved part are arc-shaped and are respectively connected to two sides of the straight part; or the outer cover is arc-shaped.

13. The rotation mechanism according to claim 10, wherein the rotation mechanism is configured in a manner that: when the rotation mechanism is in the open state, the first support abuts against a first side edge of the outer cover, and the second support abuts against a second side edge of the outer cover.

14. The rotation mechanism according to claim 9, wherein a top of the first protrusion is embedded into the first support, the first rotation shaft is inserted into the top of the first protrusion, a top of the second protrusion is embedded into the second support, and the second rotation shaft is inserted into the top of the second protrusion.

15. The rotation mechanism according to claim 9, wherein the rotation mechanism further comprises a first synchronous swing arm, a second synchronous swing arm, and a gear group;

the first synchronous swing arm comprises a rotation end and a movable end, the rotation end of the first synchronous swing arm is rotatably connected to the middle housing, the movable end of the first synchronous swing arm is movably connected to the first support, and when the first support and the second support are folded or unfolded relative to each other, the movable end of the first synchronous swing arm slides relative to the first support;

the second synchronous swing arm comprises a rotation end and a movable end, the rotation end of the second synchronous swing arm is rotatably connected to the middle housing, the movable end of the second synchronous swing arm is movably connected to the second support, and when the first support and the second support are folded or unfolded relative to each other, the movable end of the second synchronous swing arm slides relative to the second support; and the rotation end of the second synchronous swing arm is engaged with the rotation end of the first synchronous swing arm using the gear group.

16. The rotation mechanism according to claim 15, wherein the gear group comprises a plurality of gear shafts, the plurality of gear shafts are engaged with one another, each gear shaft is rotatably connected to the middle housing, and the rotation end of the first synchronous swing arm, the plurality of gear shafts, and the rotation end of the second synchronous swing arm are arranged in an arc shape.

17. The rotation mechanism according to claim 15, wherein a first sliding slot and a first limiting slot extend in the first support, the first limiting slot is in communication with the first sliding slot, the movable end of the first synchronous swing arm is disposed in the first sliding slot, the rotation mechanism further comprises a first damping member, and the first damping member is disposed in the first limiting slot and partially extends into the first sliding slot; and wherein the rotation mechanism is further configured in a manner that, when the rotation mechanism is in the open state, the first damping member abuts against the movable end of the first synchronous swing arm.

18. The rotation mechanism according to claim 17, wherein the first damping member comprises a holder and an elastic member, the holder comprises a control part and an abutting part, one end of the elastic member is mounted on the control part of the holder, the other end of the elastic member abuts against a slot wall of the first limiting slot, and wherein the rotation mechanism is further configured in a manner that: when the rotation mechanism is in the open state, the abutting part of the holder clamps the movable end of the first synchronous swing arm.

19. The rotation mechanism according to claim 9, wherein the first support is an integrally formed mechanical part, and the second support is an integrally formed mechanical part.

\* \* \* \* \*